US012645545B2

(12) United States Patent
Gupta et al.

(10) Patent No.: US 12,645,545 B2
(45) Date of Patent: Jun. 2, 2026

(54) ADAPTIVE SOURCE SIDE DEDUPLICATION

(71) Applicant: Cohesity, Inc., San Jose, CA (US)

(72) Inventors: Apurv Gupta, Bengaluru (IN);
Mandar Suresh Naik, Pune (IN);
Zhihuan Qiu, San Jose, CA (US);
Gurunarayanan Nagasubramanian,
Bengaluru (IN); Anirban Mitra,
Kolkata (IN)

(73) Assignee: Cohesity, Inc., Santa Clara, CA (US)

( * ) Notice: Subject to any disclaimer, the term of this
patent is extended or adjusted under 35
U.S.C. 154(b) by 304 days.

(21) Appl. No.: 17/852,867

(22) Filed: Jun. 29, 2022

(65) Prior Publication Data

US 2024/0004763 A1     Jan. 4, 2024

(51) Int. Cl.
*G06F 11/14*         (2026.01)
*G06F 11/1446*      (2026.01)
*G06F 16/174*        (2019.01)

(52) U.S. Cl.
CPC ...... *G06F 11/1466* (2013.01); *G06F 11/1453*
(2013.01); *G06F 16/1752* (2019.01)

(58) Field of Classification Search
CPC ............. G06F 11/1466; G06F 11/1453; G06F
16/1752
USPC .................................................. 711/162, 161
See application file for complete search history.

(56) References Cited

U.S. PATENT DOCUMENTS

| | | | |
|---|---|---|---|
| 9,740,422 B1 * | 8/2017 | Ozdemir ............. | G06F 11/1453 |
| 10,810,035 B2 | 10/2020 | Guturi et al. | |
| 10,915,260 B1 | 2/2021 | Lei et al. | |

| | | | |
|---|---|---|---|
| 2012/0221525 A1 | 8/2012 | Gold et al. | |
| 2014/0101113 A1 | 4/2014 | Zhang et al. | |
| 2014/0365449 A1 * | 12/2014 | Chambliss ............ | G06F 3/0641 |
| | | | 707/692 |
| 2015/0106345 A1 * | 4/2015 | Trimble .............. | G06F 16/1748 |
| | | | 707/692 |
| 2020/0134048 A1 * | 4/2020 | Faibish ............... | G06F 16/1748 |
| 2023/0062644 A1 | 3/2023 | Qiu et al. | |

OTHER PUBLICATIONS

Dutch, "Understanding data deduplication ratios", SNIA Data Management Forum, vol. 7, Jun. 30, 2008, 13 pp., URL: https://www.snia.org/sites/default/files/Understanding_Data_Deduplication_Ratios-20080718.pdf.
International Search Report and Written Opinion of International Application No. PCT/US2023/026486 dated Oct. 23, 2023, 14 pp.

* cited by examiner

*Primary Examiner* — Hosain T Alam
*Assistant Examiner* — Zubair Ahmed
(74) *Attorney, Agent, or Firm* — Shumaker & Sieffert, P.A.

(57)                ABSTRACT

A backup of one or more objects is determined to be performed. Based on one or more conditions, a corresponding deduplication option among a plurality of deduplication options to utilize when backing up the one or more objects is selected. The one or more conditions at least include a condition based on a detected data change pattern. The plurality of deduplication options include a deduplication option associated with utilizing at least in part a plurality of variable-length data chunks for one or more mismatched ranges and/or one or more missing ranges associated with one of the one or more objects associated with the source system. A request to perform the backup of the one or more objects according to the corresponding selected deduplication option is provided to the source system. Backup data associated with the one or more objects is received and stored.

20 Claims, 13 Drawing Sheets

200

100

Source System

| 103 Object(s) | 104 Backup Agent |

102

110

112

Storage System 111    113

115

N₁    N₂    ○ ○ ○    Nₙ

117 File System Manager

114 Metadata Store

116 Scheduler

200

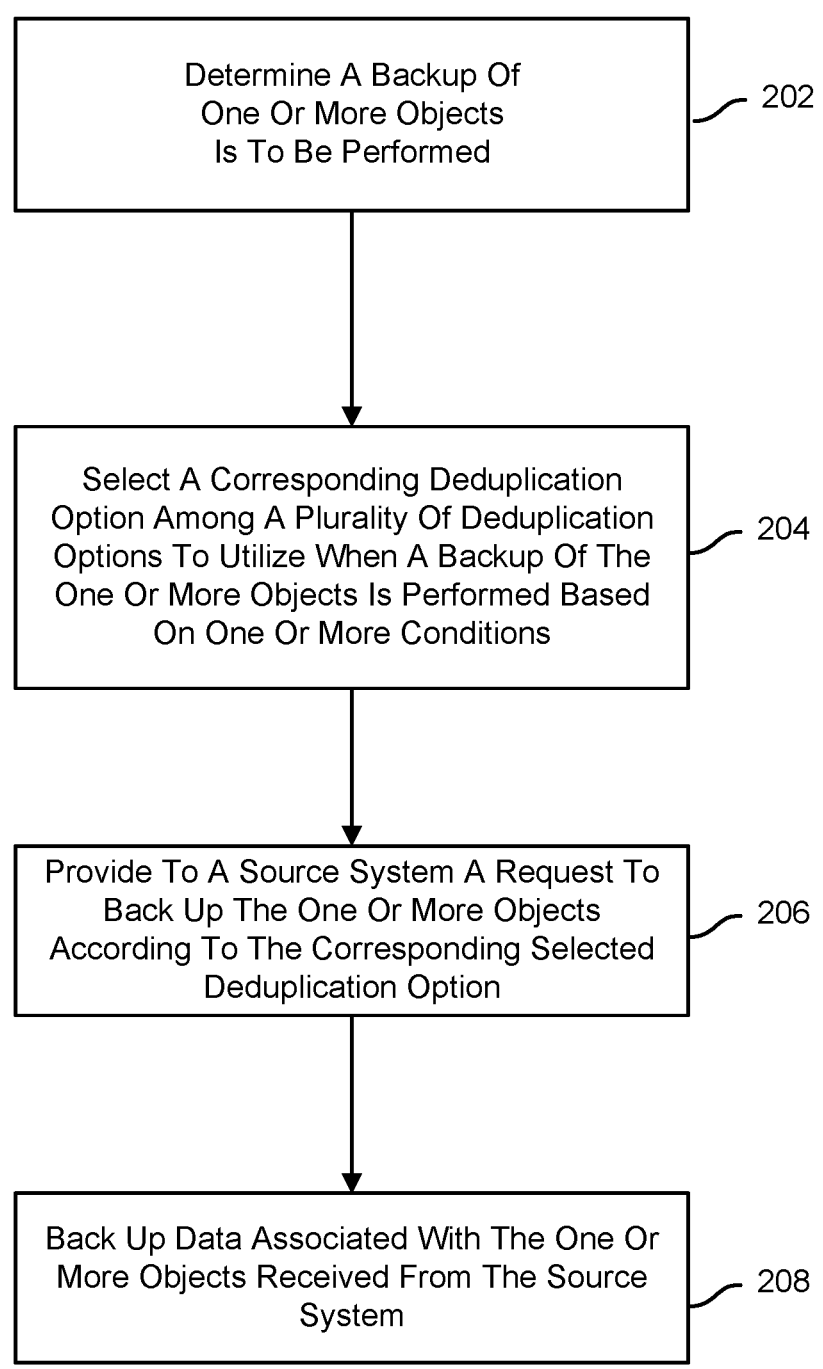

Determine A Backup Of
One Or More Objects
Is To Be Performed    202

Select A Corresponding Deduplication
Option Among A Plurality Of Deduplication
Options To Utilize When A Backup Of The
One Or More Objects Is Performed Based
On One Or More Conditions    204

Provide To A Source System A Request To
Back Up The One Or More Objects
According To The Corresponding Selected
Deduplication Option    206

Back Up Data Associated With The One Or
More Objects Received From The Source
System    208

Receive A Request To Perform A Backup Of One Or More Objects According To A Corresponding Selected Deduplication Option — 252

Perform The Backup Of The One Or More Objects Utilizing The Corresponding Selected Deduplication Option — 254

450

Receive Range Information Associated With
The Object — 452

Determine Mismatched Range(s) And/Or
Missing Range(s) — 454

460

Provide Content Of The
Mismatched Range(s)
And/Or The Missing
Range(s) Associated
With The Object ←No—

Sufficient CPU
Resources? — 456

Yes

Perform Source Side Deduplication For The
Mismatched Range(s) And/Or The Missing
Range(s) Associated With The Object — 458

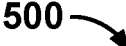

500

| Determine Range Information Associated With The Object | 502 |

↓

| Provide Range Information Associated With The Object | 504 |

↓

| Receive One Or More Data Chunk Identifiers Corresponding To One Or More Variable-Sized Data Chunks | 506 |

↓

| Determine If Any Of The Data Chunk Identifiers Are Stored In A Chunk Metadata Data Structure | 508 |

↓

| Provide A Response | 510 |

↓

| Receive And Store Content Of The One Or More Variable-Length Data Chunks Not Already Stored In A Storage Associated With The Storage System | 512 |

FIG. 5A

520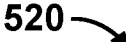

```
┌─────────────────────────────────────────┐
│  Chunk Content Associated With One Or    │
│  More Determined Mismatched Ranges       │──── 522
│  And/Or One Or More Determined Missing   │
│  Ranges Into A Plurality Of              │
│  Variable-Sized Data Chunks              │
└─────────────────────────────────────────┘
                   │
                   ▼
┌─────────────────────────────────────────┐
│  Generate A Corresponding Data Chunk     │──── 524
│  Identifier For Each Of The              │
│  Variable-Sized Data Chunks              │
└─────────────────────────────────────────┘
                   │
                   ▼
┌─────────────────────────────────────────┐
│  Provide The Data Chunk Identifiers To   │──── 526
│  A Storage System                        │
└─────────────────────────────────────────┘
                   │
                   ▼
┌─────────────────────────────────────────┐
│                                          │
│        Receive A Response                │──── 528
│                                          │
└─────────────────────────────────────────┘
                   │
                   ▼
┌─────────────────────────────────────────┐
│  Provide Content Of The One Or More      │──── 530
│  Variable-Sized Data Chunks Not Already  │
│  Stored In A Storage Associated With     │
│  The Storage System                      │
└─────────────────────────────────────────┘
```

Determine To Perform A Backup Of One Or More Objects Associated With A Source System ⟋ 542

Determine Range Information Associated With One Or More Objects ⟋ 544

Provide Range Information Associated With One Or More Objects ⟋ 546

Ingest And Store Data Associated With The One Or More Objects ⟋ 548

560

Receive Range Information Associated With One Or More Objects — 562

Determine One Or More Missing Ranges And/Or One Or More Mismatched Ranges Associated With The One Or More Objects Based On The Received Range Information — 564

Provide Content Associated With The One Or More Determined Ranges — 566

600

Select A Data Chunk Identifier — 602

In Chunk Metadata Data Structure? — 604

Yes → Exclude Data Chunk Identifier From Response — 610

No

Include Data Chunk Identifier In Response — 606

More Data Chunk Identifiers? — 608

Yes

No

End

700

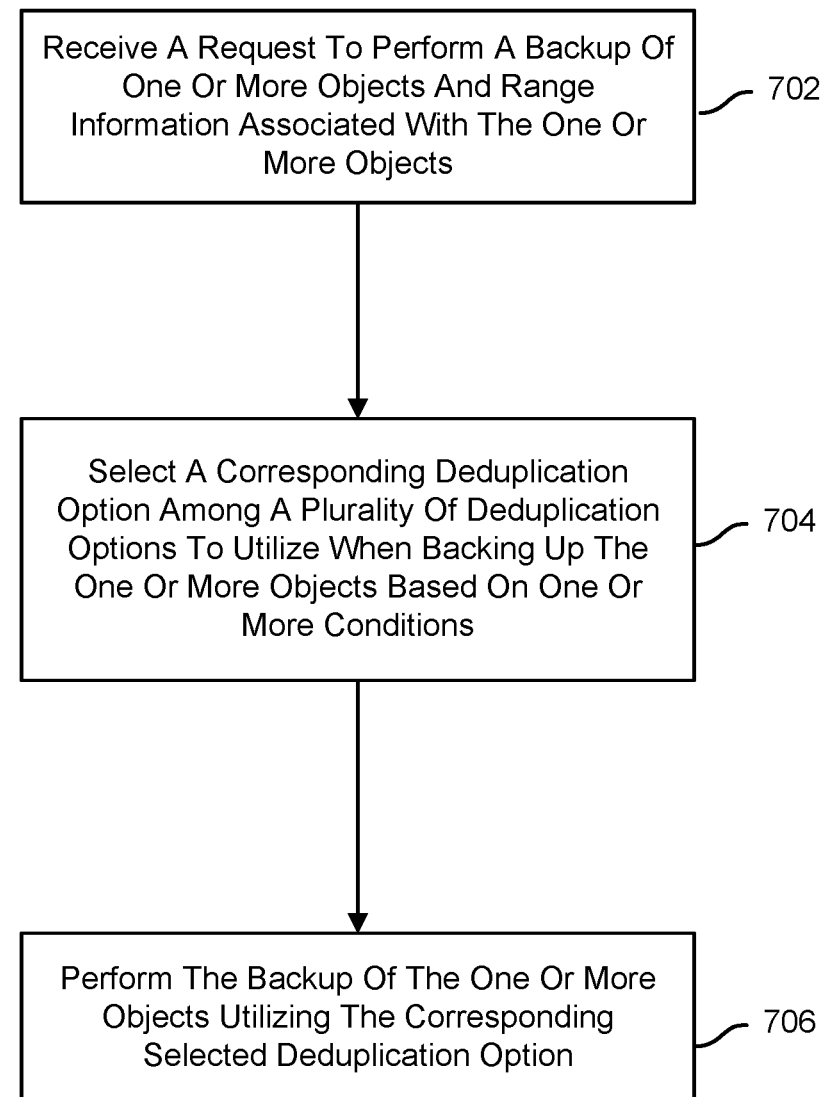

Receive A Request To Perform A Backup Of One Or More Objects And Range Information Associated With The One Or More Objects — 702

Select A Corresponding Deduplication Option Among A Plurality Of Deduplication Options To Utilize When Backing Up The One Or More Objects Based On One Or More Conditions — 704

Perform The Backup Of The One Or More Objects Utilizing The Corresponding Selected Deduplication Option — 706

FIG. 7

ADAPTIVE SOURCE SIDE DEDUPLICATION

BACKGROUND OF THE INVENTION

A storage system may back up data from a source system, but constraints associated with a backup, such as network speed and/or an amount of data to be backed up (e.g., 25 TB), may prevent the backup from being completed within a specified amount of time (e.g., 3-5 hours).

The source system may reduce the amount of data that is backed up to enable the backup to be completed within the specified amount of time by performing source side deduplication by chunking the backup data into variable-length data chunks, generating corresponding chunk identifiers for the variable-length data chunks, and sending the corresponding chunk identifiers to the storage system. In response, the storage system may determine from the corresponding chunk identifiers which of the variable-length data chunks are not currently stored by the storage system and provide to the source system a list of one or more chunk identifiers corresponding to data chunks that are not currently stored by the storage system. The source system may subsequently provide to the storage system the one or more data chunks corresponding to the one or more chunk identifiers included in the list.

Although this may reduce the amount of data that is transferred, the steps of chunking the backup data into variable-length data chunks and generating corresponding chunk identifiers for the variable-length data chunks are a highly CPU intensive process for the source system. For some objects, it is an inefficient use of source system CPU resources to perform a backup in the manner described above to ensure that the backup is completed within the specified amount of time. The above source side deduplication technique reduces the amount of source system CPU resources that are available to perform one or more other processes. As a result, a performance of the one or more other processes may be reduced.

BRIEF DESCRIPTION OF THE DRAWINGS

Various embodiments of the invention are disclosed in the following detailed description and the accompanying drawings.

FIG. 2A is a flow diagram illustrating a process for selecting a source side deduplication option in accordance with some embodiments.

FIG. 5A is a flow diagram illustrating a process for reducing the amount of data received from a source system during a backup in accordance with some embodiments.

FIG. 5B is a flow diagram illustrating a process for performing source side deduplication in accordance with some embodiments.

FIG. 7 is a flow diagram illustrating a process for performing a backup in accordance with some embodiments.

DETAILED DESCRIPTION

Figure 1:
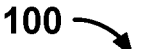
FIG. 1 is a block diagram illustrating an embodiment of a system for adaptively performing source side deduplication.

Techniques to adaptively perform source side deduplication are disclosed. There is a cost associated with performing a backup of one or more objects associated with a source system. The associated costs include an amount of CPU resources used by the source system, an amount of time needed to complete the backup, an amount of network bandwidth needed to provide the data associated with the one or more objects from the source system to a storage system, etc. When the delta between two successive backups is small (e.g., less than a threshold amount of data), a cost associated with performing a backup of a source system may be dominated by the cost associated with generating data chunks and comparing data chunk identifiers corresponding to the generated data chunks to identify data chunks(s) not stored by the storage system. The disclosed techniques may reduce the costs associated with performing the backup of one or more objects associated with the source system. An object may refer to a data object (e.g., a file, a virtual machine, a database, an application, a container, etc.). Although the techniques are described with respect to backup, the techniques disclosed herein may be applicable whenever a data management operation (e.g., backup, migration, replication, archive, etc.) is performed for a cohort of data that is provided from a first system to a second system.

When the storage system performs a backup, it receives data chunks associated with one or more objects, stores the data chunks associated with the one or more objects across one or more storage devices, and generates metadata that enables the data chunks associated with the one or more objects to be located. The data stored by the storage system is deduplicated to optimize a storage of the storage system. In some embodiments, the data stored by the storage system is associated with a single data source (e.g., the source system). In some embodiments, the data stored by the storage system is associated with a plurality of data sources (e.g., the source system and one or more other source systems). In some embodiments, the storage system receives data associated with one or more objects, chunks the data associated with the one or more objects into a plurality of data chunks (e.g., variable-length data chunks), stores the data chunks associated with the one or more objects, and generates metadata that enables the data chunks associated with the one or more objects to be located.

The storage system generates and maintains metadata, such as a chunk metadata data structure, a chunk file metadata data structure, a tree data structure, and a brick metadata data structure. The chunk metadata data structure is comprised of a plurality of entries. Each entry associates a data chunk identifier corresponding to a data chunk with a chunk file identifier corresponding to a chunk file storing the data chunk. The chunk file metadata data structure is comprised of a plurality of entries. Each entry associates a chunk file identifier corresponding to a chunk file with one or more data chunk identifiers corresponding to one or more data chunks. This indicates the one or more data chunks that are stored in the chunk file having the chunk file identifier.

An example of a tree data structure is described in U.S. patent application Ser. No. 16/287,214 entitled "Deploying A Cloud Instance of a User Virtual Machine," filed on Feb. 27, 2019, which is incorporated herein by reference for all purposes. The tree data structure includes a plurality of nodes that are associated with corresponding data bricks. A data brick is associated with one or more data chunks. A data brick may have a fixed length (e.g., 256 kb, 512 kb, etc.). The one or more data chunks associated with the data brick may each have a size of 8 kb-16 kb. The brick metadata data structure is comprised of a plurality of entries. Each entry corresponds to a data brick and associates a brick identifier corresponding to the data brick with a range chunk identifier corresponding to a particular range of an object. For example, the range chunk identifier may correspond to a range of 256 kb-512 kb of an object. The range chunk identifier corresponds to the one or more data chunks included in the particular range of the object. For example, data brick 1 may be associated with chunks C1, C2, and C3. A range chunk identifier C123 may be computed for the combination of chunks C1, C2, and C3 and stored in the entry corresponding to data brick 1. The brick metadata data structure is updated after a backup of a source system is completed.

The storage system includes a scheduler that determines a backup of one or more objects associated with a source system that is to be performed. The scheduler may determine that a backup is to be performed according to a schedule or an ad-hoc user input. The one or more objects associated with the source system may include one or more objects that were previously backed up to the storage system and/or one or more new objects that were not previously backed up to the storage system. In some embodiments, a full backup of an object is determined to be performed. In some embodiments, an incremental backup of the object is determined to be performed.

In a first technique, the scheduler of the storage system, selects, based on one or more conditions, a corresponding deduplication option among a plurality of deduplication options to utilize when a backup of the one or more objects is performed. A backup of the one or more objects associated with the source system may be subject to a service-level objective (e.g., a time constraint of 3-5 hours). The backup of the one or more objects associated with the source system may not be able to be completed within the time constraint due to the one or more conditions, such as resource availability (e.g., CPU utilization at the source system, network bandwidth, etc.), data change rate, distribution of data change across objects, data change within objects (e.g., append only, insertion only, append and insertion, etc.), object size, etc. Using the first technique, the scheduler of the storage system may adaptively select a corresponding deduplication option from a plurality of deduplication options for each of the one or more objects based on the one or more conditions. This may enable the backup of the one or more objects to be completed within the time constraint.

The scheduler selects an object and determines whether a historical size associated with the object is greater than a threshold size. In some embodiments, the threshold size is a static threshold. In some embodiments, the threshold size is a dynamic threshold. In response to a determination that the historical size associated with the object is not greater than the threshold size, a first deduplication option (e.g., no source side deduplication) is selected. For an object associated with the first deduplication option, the storage system requests the source system to provide data associated with the object (e.g., object metadata, object content data) to the storage system.

In response to a determination that the historical size associated with the object is greater than the threshold size, an object identifier is determined and provided to a file system manager of the storage system. The scheduler maintains information about each of the backups (e.g., network speed, CPU resources used, etc.). The scheduler also maintains statistics for each of the backed-up objects and each version of a backed-up object. The statistics may be based on a data change pattern. The data change pattern for an object may be detected by using a rolling hash algorithm. In some embodiments, the detected data change pattern associated with the object includes one or more mismatched ranges (e.g., data overwrites and/or data insertions). In some embodiments, the detected data change pattern associated with the object includes one or more mismatched ranges and/or one or more missing ranges (e.g., data appends). In some embodiments, the detected data change pattern associated with the object includes one or more missing ranges. In some embodiments, a mismatched range corresponds to a portion of an object that was overwritten with new data since the previous backup. In some embodiments, a mismatched range corresponds to a portion of an object where data was inserted into the range since the previous backup. A missing range corresponds to a portion of an object that was not previously backed up.

The scheduler maintains statistics, such as an average (e.g., average, running average) of the number of mismatched ranges associated with the object, a percentage of mismatched ranges associated with different backed up versions of the object, a number of missing ranges associated with the object, a percentage of missing ranges associated with different backed up versions of the object, etc. A historical percentage of mismatched ranges for the object (e.g., an average) may be determined and compared to a threshold percentage. In response to a determination that the historical percentage of mismatched ranges for the object is greater than the threshold percentage, a second deduplication option is selected.

For an object associated with the second deduplication option, the storage system requests the source system to perform source side deduplication for the entire object by chunking the data associated with the object into variable-length data chunks, generating corresponding chunk identifiers for the variable-length data chunks, and sending the corresponding chunk identifiers to the storage system. In response, the storage system determines from the corresponding chunk identifiers which of the variable-length data chunks that are not currently stored by the storage system and provides to the source system a list of one or more chunk identifiers corresponding to data chunks that are not currently stored by the storage system. The source system subsequently provides to the storage system the one or more data chunks corresponding to the one or more chunk identifiers included in the list.

In response to a determination that the historical percentage of mismatched ranges for the object is not greater than the threshold percentage, the storage system may determine whether there has historically been sufficient network bandwidth when data has been transferred from the source system to the storage system. In response to a determination that there has not historically been sufficient network bandwidth when data has been transferred from the source system to the storage system, a third deduplication option is selected. In response to a determination that there has historically been sufficient network bandwidth (e.g., more than a network bandwidth threshold), a fourth deduplication option is selected.

For an object associated with the third deduplication option, the storage system provides to the source system range information associated with the object and requests the source system to perform source side deduplication by computing mismatched and/or missing ranges using range information provided by the storage system. After the mismatched and/or missing ranges are determined, the source system may perform source side deduplication by chunking the data associated with one or more determined missing ranges and/or one or more determined mismatched ranges into a plurality of variable-length data chunks, generating a plurality of data chunk identifiers corresponding to the variable-length data chunks, and providing the plurality of corresponding data chunk identifiers to the storage system.

Range information for an object includes one or more range chunk identifiers, a corresponding offset for each of the one or more range chunk identifiers, and a corresponding length for the one or more data chunks associated with a range chunk identifier for each of the one or more range chunk identifiers. In some embodiments, the range information for an object includes one or more data chunk identifiers corresponding to the one or more data chunks associated with a range chunk identifier for each of the one or more range chunk identifiers.

The source system includes a backup agent that determines whether there are one or more missing ranges and/or one or more mismatched ranges associated with the one or more objects based on the corresponding range information. For example, there may have been data appended to the object since the previous backup or an entire new object was created since the last backup. The backup agent may determine that there is a missing range in response to a determination that the received range information does not cover the missing range.

The backup agent may determine that a mismatched range exists by comparing the range chunk identifier included in the received range information associated with a portion of an object to a current range chunk identifier corresponding to the portion of the object. A mismatched range exists for a portion of an object when the range chunk identifier included in the received range information associated with the portion of the object does not match the current range chunk identifier corresponding to the portion of the object. For example, the received range information may indicate that a portion of the object associated with 256 kb to 512 kb is associated with the range chunk identifier C123. However, the backup agent may determine that there is a mismatched range because the current range chunk identifier for the data included in the range of 256 kb to 512 kb is C456.

Even though the storage system requested the source system to perform deduplication according to the third deduplication option, the backup agent determines whether the source system has sufficient CPU resources to perform source side deduplication for a portion of the object (e.g., the one or more determined mismatched ranges and/or the one or more missing ranges). In response to a determination that the source system has sufficient CPU resources, the backup agent performs the third deduplication option as requested by the storage system by chunking the data associated with one or more determined missing ranges and/or one or more determined mismatched ranges into a plurality of variable-length data chunks, generating a plurality of corresponding data chunk identifiers, and providing the plurality of corresponding data chunk identifiers to the storage system. In some embodiments, the backup agent compares the plurality of generated data chunk identifiers to the one or more data chunk identifiers corresponding to the one or more data chunks associated with the one or more determined ranges included in the received range information and provides one or more corresponding data chunk identifiers not included in the received range information.

In response, the file system manager of the storage system compares the received data chunk identifiers to data chunk identifiers included in the chunk metadata data structure to identify one or more of the plurality of variable-length data chunks that are not stored in a storage associated with the storage system. The storage system provides to the source system a response that identifies among the plurality of variable-length data chunks, one or more variable-length data chunks not already stored in the storage associated with the storage system. In some embodiments, the response identifies the one or more data chunk identifiers corresponding to variable-length data chunks not already stored in the storage associated with the storage system. In some embodiments, the response identifies the one or more data chunk identifiers corresponding to variable-length data chunks already stored in the storage associated with the storage system. In response, the source system may eliminate the one or more variable-length data chunks corresponding to the one or more identified data chunk identifiers. Subsequently, the source system provides content of the one or more variable-length data chunks not already stored in the storage associated with the storage system. The storage system receives and stores the content of the one or more variable-length data chunks not already stored in the storage associated with the storage system. Performing source side deduplication in the manner described above requires less source side CPU resources and less bandwidth to transmit data between the source system and the storage system when compared with performing source side deduplication in a manner described in the background of the invention.

In response to a determination that the source system does not have sufficient CPU resources, the backup agent performs a fourth deduplication option (no source side deduplication for the one or more determined missing ranges and/or the one or more determined mismatched ranges) instead of performing the third deduplication option as requested by the storage system and provides to the storage system content associated with the one or more determined missing ranges and/or the one or more determined mismatched ranges.

The storage system receives from the source system backup data associated with the one or more objects. In some embodiments, the received backup data associated with the one or more objects includes one or more data chunks associated with the one or more objects. The storage system ingests and stores the one or more data chunks associated with the one or more objects.

In some embodiments, the received backup data associated with the one or more objects includes content data associated with the one or more objects. The storage system ingests the backup data associated with the one or more objects and may perform in-line deduplication, post-processing deduplication, or a combination of partial in-line deduplication and partial post-processing deduplication on the data associated with the object. An example of a partial in-line deduplication and partial post-processing deduplication process is described in U.S. patent application Ser. No. 17/410,745 entitled "PARTIAL IN-LINE DEDUPLICATION AND PARTIAL POST-PROCESSING DEDUPLICATION OF DATA CHUNKS," filed on Aug. 24, 2021, the entire contents of which are incorporated by reference for all purposes.

For an object associated with the fourth deduplication option, the storage system provides to the source system range information associated with the object and a request to provide data associated with one or more missing ranges and/or one or more mismatched ranges. In response, the source system determines one or more missing ranges and/or one or more mismatched ranges based on the received range information and provides to the storage system the data associated with the one or more determined missing ranges and/or one or more determined mismatched ranges.

The scheduler of the storage system performs the above deduplication selection process for the one or more objects associated with the source system. The storage system is configured to select a deduplication option from at least two of the deduplication options described above.

In a second technique, the scheduler determines a backup of one or more objects associated with a source system that is to be performed and provides to the file system manager of the storage system, a corresponding object identifier for each of the one or more objects. The file system manager utilizes the corresponding object identifier to determine corresponding range information associated with the one or more objects. The storage system provides to the source system a request to back up the one or more objects and corresponding range information for the one or more objects.

The source system includes a backup agent. A backup of the one or more objects associated with the source system may be subject to a service-level objective (e.g., a time constraint of 3-5 hours). The backup of the one or more objects associated with the source system may not be able to be completed within the time constraint due to one or more conditions, such as resource availability (e.g., CPU utilization at the source system, network bandwidth, etc.), data change rate, distribution of data change across objects, data change within objects (e.g., append only, insertion only, append and insertion, etc.), object size, etc. Using the second technique, the backup agent may adaptively select a deduplication option from a plurality of deduplication options to utilize when backing up the one or more objects based on the one or more conditions. This may enable the backup to be completed within the time constraint.

In response to receiving the request and corresponding range information for the one or more objects associated with the source system, the backup agent selects one of the one or more objects and determines a size of the object. The backup agent determines whether the object size is greater than a threshold size. In response to a determination that the object size is not greater than the threshold size, the backup agent selects a first deduplication option for the object where source side deduplication is not required for the object. In response to selecting the first deduplication option, the source system sends the data associated with the object to the storage system. In some embodiments, for an object having a size that is not greater than the threshold size, the source system sends the data associated with the object when a full backup of the object is performed. In some embodiments, for an object having a size that is not greater than the threshold size, the source system sends the data associated with the object that has changed since a previous backup when an incremental backup of the object is performed.

For an object having a size greater than the threshold size, the backup agent may determine whether there are one or more missing ranges and/or one or more mismatched ranges associated with the one or more objects based on the corresponding range information. For an object that has a size greater than the threshold size, the backup agent analyzes the data associated with an object (e.g., by using a rolling hash algorithm) to determine whether a percentage of the one or more mismatched ranges, if any, is greater than a threshold percentage. In some embodiments, the threshold percentage is a static threshold. In some embodiments, the threshold percentage is a dynamic threshold. In some embodiments, the threshold percentage is based on historical percentages associated with the object. In response to a determination that the percentage of the one or more mismatched ranges is greater than the threshold percentage, the backup agent selects a second deduplication option for the object where source side deduplication is performed for the entire object. The backup agent may select the second deduplication option as soon as the threshold percentage is exceeded without comparing all of the current range chunk identifiers to corresponding range chunk identifiers included in the received range information. For example, an object may have a size of 100 GB. The threshold percentage may be 50%. The backup agent may compute current range chunk identifiers for the first 60 GB of the object, compare the current range chunk identifiers to the range chunk identifiers included in the received range information, and determine that 50.1% of the range comparisons are mismatched. The backup agent may subsequently select the second deduplication option without computing current range chunk identifiers for the remaining 40 GB of the object and performing the comparison. This reduces backup costs because the source system does not need to use CPU resources to compute additional range chunk identifiers and perform additional range chunk identifier comparisons. In response to a determination that the percentage of the one or more mismatched ranges is not greater than the threshold percentage, the backup agent determines whether the source system has sufficient resources to perform source side deduplication.

In response to a determination that the source system has sufficient resources to perform source side deduplication, the backup agent selects a third deduplication option for the object where source side deduplication is performed for one or more missing ranges and/or one or more mismatched ranges associated with the object. In response to a determination that the source system does not have sufficient resources to perform source side deduplication, the backup agent selects a fourth deduplication option of an object where source side deduplication is not performed for one or more missing ranges and/or one or more mismatched ranges associated with the object.

The backup agent performs the above deduplication selection process for the one or more objects associated with the source system. The backup agent performs the backup of the one or more objects utilizing the corresponding selected deduplication option. In some embodiments, a backup of a first object is performed in parallel as the backup agent selects a deduplication option for a second object. In some embodiments, a backup of the one or more objects is performed after the backup agent selects a deduplication option for each of the one or more objects.

For an object associated with the first deduplication option, the source system sends the data associated with the object to the storage system. The storage system ingests the data associated with the object and may perform in-line deduplication, post-processing deduplication, or a combination of partial in-line deduplication and partial post-processing deduplication on the data associated with the object.

For an object associated with the second deduplication option, the source system chunks the object data into variable-length data chunks, generates corresponding chunk identifiers for the variable-length data chunks, and sends the corresponding chunk identifiers to the storage system. In response, the storage system determines from the corresponding chunk identifiers which of the variable-length data chunks that are not currently stored by the storage system and provides to the source system a list of one or more chunk identifiers corresponding to data chunks that are not currently stored by the storage system. The source system subsequently provides to the storage system the one or more data chunks corresponding to the one or more chunk identifiers included in the list.

For an object associated with the third deduplication option, the source system computes mismatched and/or missing ranges using range information provided by the storage system. After the mismatched and/or missing ranges are determined, the source system may perform the third deduplication option chunking the data associated with one or more determined missing ranges and/or one or more determined mismatched ranges into a plurality of variable-length data chunks, generating a plurality of corresponding data chunk identifiers, and providing the plurality of corresponding data chunk identifiers to the storage system. In some embodiments, the backup agent compares the plurality of generated data chunk identifiers to the one or more data chunk identifiers corresponding to the one or more data chunks associated with the one or more determined ranges included in the received range information and provides one or more corresponding data chunk identifiers not included in the received range information. In response, the file system manager of the storage system compares the received data chunk identifiers to data chunk identifiers included in the chunk metadata data structure to identify one or more of the plurality of variable-length data chunks that are not stored in a storage associated with the storage system. The storage system provides to the source system a response that identifies among the plurality of variable-length data chunks, one or more variable-length data chunks not already stored in the storage associated with the storage system. In some embodiments, the response identifies the one or more data chunk identifiers corresponding to variable-length data chunks not already stored in the storage associated with the storage system. In some embodiments, the response identifies the one or more data chunk identifiers corresponding to variable-length data chunks already stored in the storage associated with the storage system. In response, the source system may eliminate the one or more variable-length data chunks corresponding to the one or more identified data chunk identifiers. Subsequently, the source system provides content of the one or more variable-length data chunks not already stored in the storage associated with the storage system. The storage system receives and stores the content of the one or more variable-length data chunks not already stored in the storage associated with the storage system.

The number of resources needed by the source system to back up the data associated with one or more objects from the source system to the storage system is reduced because variable-length data chunks are generated for a subset of the data associated with the one or more objects instead of being generated for all of the data associated with the one or more objects. Also, the amount of data transmitted between the source system and the storage system is reduced because variable-length data chunks are transmitted for a subset of the data associated with the one or more objects instead of being transmitted for all of the data associated with the one or more objects.

For an object associated with the fourth deduplication option, the source system provides to the storage system content associated with the one or more determined missing and/or mismatched ranges. In response, the storage system ingests the content associated with the one or more determined missing and/or mismatched ranges. In some embodiments, the storage system performs in-line deduplication on the ingested data. In some embodiments, the storage system stores the ingested data and performs post-processing deduplication on the stored data. In some embodiments, the storage system performs partial in-line deduplication and partial post-processing deduplication on the ingested data. When compared with the third deduplication option, the fourth deduplication option reduces the amount of CPU resources utilized by the backup agent to perform source side deduplication because the backup agent does not need to chunk the data and generate chunk identifiers, but the amount of data that is transmitted between the source system and the storage system is increased. As a result, the overall time to perform a backup is more influenced by the amount of available network bandwidth between the source system and the storage system. However, using the fourth deduplication option to back up data associated with one or more source system objects may be less when compared with a backup technique of merely chunking the backup data into variable-length data chunks, generating corresponding data chunk identifiers for the variable-length data chunks, and sending the corresponding data chunk identifiers to the storage system.

FIG. 1 is a block diagram illustrating an embodiment of a system for adaptively performing source side deduplication. In the example shown, system 100 includes a source system 102 and a storage system 112. Source system 102 is coupled to storage system 112 via connection 110. Connection 110 may be a wired or wireless connection. Connection 110 may be a LAN, WAN, intranet, the Internet, and/or a combination thereof.

Source system 102 is a computing system that stores file system data. The file system data may include a plurality of files (e.g., content files, text files, etc.) and metadata associated with the plurality of files. Source system 102 may be comprised of one or more servers, one or more computing devices, one or more storage devices, and/or a combination thereof.

Source system 102 may be configured to run one or more objects 103. Examples of objects include, but are not limited to, a virtual machine, a database, an application, a container, a pod, etc. Source system 102 may include one or more storage volumes (not shown) that are configured to store file system data associated with source system 102. The file system data associated with source system 102 includes the data associated with the one or more objects 103. In some embodiments, an object may refer to a file.

Backup agent 104 may be configured to cause source system 102 to perform a backup (e.g., a full backup or incremental backup). A full backup may include all of the file system data of source system 102 at a particular moment in time. In some embodiments, a full backup for a particular object of the one or more objects 103 is performed and the full backup of the particular object includes all of the object data associated with the particular object at a particular moment in time. An incremental backup may include all of the file system data of source system 102 that has not been backed up since a previous backup. In some embodiments, an incremental backup for a particular object of the one or more objects 103 is performed and the incremental backup of the particular object includes all of the object data associated with the particular object that has not been backed up since a previous backup.

In some embodiments, backup agent 104 is running on source system 102. In some embodiments, backup agent 104 is running in one of the one or more objects 103. In some embodiments, a backup agent 104 is running on source system 102 and a separate backup agent 104 is running in one of the one or more object 103. In some embodiments, an object includes a backup function and is configured to perform a backup on its own without backup agent 104. In some embodiments, source system 102 includes a backup function and is configured to perform a backup on its own without backup agent 104. In some embodiments, storage system 112 may provide instructions to source system 102, causing source system 102 to execute backup functions without the backup agent 104.

Storage system 112 is comprised of a storage cluster that includes a plurality of storage nodes 111, 113, 115. Although three storage nodes are shown, storage system 112 may be comprised of n storage nodes.

In some embodiments, the storage nodes are homogenous nodes where each storage node has the same capabilities (e.g., processing, storage, memory, etc.). In some embodiments, at least one of the storage nodes is a heterogeneous node with different capabilities (e.g., processing, storage, memory, etc.) than the other storage nodes of storage system 112.

In some embodiments, a storage node of storage system 112 includes a processor, memory, and a plurality of storage devices. The plurality of storage devices may include one or more solid state drives, one or more hard disk drives, or a combination thereof.

In some embodiments, a storage node of storage system 112 includes a processor and memory, and is coupled to a separate storage device. The separate storage device may include one or more storage devices (e.g., flash storage devices). A storage device may be segmented into a plurality of partitions. Each of the storage nodes 111, 113, 115 may be allocated one or more of the partitions. The one or more partitions allocated to a storage node may be configured to store data associated with some or all of the plurality of objects that were backed up to storage system 112. For example, the separate storage device may be segmented into 10 partitions and storage system 112 may include 10 storage nodes. A storage node of the 10 storage nodes may be allocated one of the 10 partitions.

In some embodiments, a storage node of storage system 112 includes a processor, memory, and a storage device. The storage node may be coupled to a separate storage device. The separate storage device may include one or more storage devices. A storage device may be segmented into a plurality of partitions. Each of the storage nodes 111, 113, 115 may be allocated one or more of the partitions. The one or more partitions allocated to a storage node may be configured to store data associated with some or all of the plurality of objects that were backed up to storage system 112. For example, the separate storage device may be segmented into 10 partitions and storage system 112 may include 10 storage nodes. A storage node of the 10 storage nodes may be allocated one of the 10 partitions.

Storage system 112 may be a cloud instantiation of a storage system. A configuration of a cloud instantiation of storage system 112 may be a virtual replica of a storage system. For example, a storage system may be comprised of three storage nodes, each storage node with a storage capacity of 10 TB. A cloud instantiation of the storage system may be comprised of three virtual nodes, each virtual node with a storage capacity of 10 TB. In other embodiments, a cloud instantiation of a storage system may have more storage capacity than an on-premises instantiation of a storage system. In other embodiments, a cloud instantiation of a storage system may have less storage capacity than an on-premises instantiation of a storage system.

Storage system 112 includes a file system manager 117 that is configured to organize the file system data of the backup using a tree data structure. An example of the tree data structure is a snapshot tree, which may be based on a B+ tree structure (or other type of tree structure in other embodiments). Storage system 112 may store a plurality of tree data structures in metadata store 114, which is accessible by storage nodes 111, 113, 115. Metadata store 114 may be stored in one or more memories of the storage nodes 111, 113, 115. Storage system 112 may generate a snapshot tree and one or more metadata structures for each backup.

In the event the backup corresponds to all of the file system data of source system 102, a view corresponding to the backup may be comprised of a snapshot tree and one or more object metadata structures. The snapshot tree may be configured to store the metadata associated with source system 102. An object metadata structure may be configured to store the metadata associated with one of the one or more objects 103. Each of the one or more objects 103 may have a corresponding metadata structure.

In the event the backup corresponds to all of the object data of one of the one or more objects 103 (e.g., a backup of a virtual machine), a view corresponding to the backup may be comprised of a snapshot tree and one or more object file metadata structures. The snapshot tree may be configured to store the metadata associated with one of the one or more objects 103. An object file metadata structure may be configured to store the metadata associated with an object file included in the object.

The tree data structure may be used to capture different views of data. A view of data may correspond to a full backup, an incremental backup, a clone of data, a file, a replica of a backup, a backup of an object, a replica of an object, a tiered object, a tiered file, etc. The tree data structure allows a chain of snapshot trees to be linked together by allowing a node of a later version of a snapshot tree to reference a node of a previous version of a snapshot tree. For example, a root node or an intermediate node of a snapshot tree corresponding to a second backup may reference an intermediate node or leaf node of a snapshot tree corresponding to a first backup.

A snapshot tree is a representation of a fully hydrated restoration point because it provides a complete view of source system 102, an object 103, or data generated on or by the storage system 112 at a particular moment in time. A fully hydrated restoration point is a restoration point that is ready for use without having to reconstruct a plurality of backups to use it. Instead of reconstructing a restoration point by starting with a full backup and applying one or more data changes associated with one or more incremental backups to the data associated with the full backup, storage system 112 maintains fully hydrated restoration points. Any file associated with source system 102, an object at a particular time and the file's contents, or a file generated on or by storage system 112, for which there is an associated reference restoration point, may be determined from the snapshot tree, regardless if the associated reference restoration was a full reference restoration point or an intermediate reference restoration point.

A snapshot tree may include a root node, one or more levels of one or more intermediate nodes associated with the root node, and one or more leaf nodes associated with an intermediate node of the lowest intermediate level. The root node of a snapshot tree may include one or more pointers to one or more intermediate nodes. Each intermediate node may include one or more pointers to other nodes (e.g., a lower intermediate node or a leaf node). A leaf node may store file system metadata, data associated with a file that is less than a limit size, an identifier of a data brick, a pointer to a metadata structure (e.g., object metadata structure or an object file metadata structure), a pointer to a data chunk stored on the storage cluster, etc.

A metadata structure (e.g., object file metadata structure, object metadata structure, file metadata structure) may include a root node, one or more levels of one or more intermediate nodes associated with the root node, and one or more leaf nodes associated with an intermediate node of the lowest intermediate level. The tree data structure associated with a metadata structure allows a chain of metadata structures corresponding to different versions of an object, an object file, or a file to be linked together by allowing a node of a later version of a metadata structure to reference a node of a previous version of a metadata structure. A leaf node of a metadata structure may store information, such as an identifier of a data brick associated with one or more data chunks and information associated with the one or more data chunks.

Storage system 112 maintains metadata that is stored in metadata store 114, such as a chunk metadata data structure, a chunk file metadata data structure, and a brick data structure. The chunk metadata data structure is comprised of a plurality of entries. Each entry associates a chunk identifier corresponding to a data chunk with a chunk file identifier corresponding to a chunk file storing the data chunk. The chunk file metadata data structure is comprised of a plurality of entries. Each entry associates a chunk file identifier corresponding to a chunk file with one or more chunk identifiers corresponding to one or more data chunks. This indicates the one or more data chunks that are stored in the chunk file having the chunk file identifier. Storage system 112 may store a plurality of chunk files for one or more storage tenants. The data stored by storage system 112 may be deduplicated across the one or more storage tenants.

The tree data structure includes a plurality of nodes that are associated with corresponding data bricks. A data brick is associated with one or more data chunks. A size of a fixed-size data chunk may be the same size as a data brick, e.g., a size of a data brick is 256 kb-512 kb. The one or more data chunks associated with the data brick may each have a size of 8 kb-16 kb. The brick metadata data structure is comprised of a plurality of entries. Each entry corresponds to a data brick and associates a brick identifier corresponding to the data brick with a chunk identifier corresponding to the one or more data chunks associated with the data brick.

Storage system 112 includes scheduler 116 that determines a backup of one or more objects 103 associated with source system 102 that is to be performed. The one or more objects 103 associated with source system 102 may include one or more objects that were previously backed up to storage system 112 and/or one or more new objects that were not previously backed up to the storage system. In some embodiments, a full backup of an object is determined to be performed. In some embodiments, an incremental backup of the object is determined to be performed.

In a first technique, scheduler 116, selects, based on one or more conditions, a corresponding deduplication option among a plurality of deduplication options to utilize when a backup of the one or more objects 103 is to be performed. A backup of the one or more objects 103 may be subject to a service-level objective (e.g., a time constraint of 3-5 hours). The backup of the one or more objects 103 may not be able to be completed due to one or more conditions, such as resource availability (e.g., CPU utilization at the source system, network bandwidth, etc.), data change rate, distribution of data change across objects, data change within objects (e.g., append only, insertion only, append and insertion, etc.), object size, etc. Using the first technique, scheduler 116 may adaptively select a deduplication option from a plurality of deduplication options based on the one or more conditions. This may enable the backup to be completed within the time constraint.

In some embodiments, the deduplication option is selected by a machine learning model. The machine learning model may be a supervised learning machine learning model, a semi-supervised machine learning model, an unsupervised machine learning model, or a reinforcement machine learning model. Examples of machine learning model algorithms include a Naïve Bayes classifier algorithm, K Means clustering algorithm, support vector machine algorithm, linear regression, logistic regression, artificial neural networks, decision trees, random forests, nearest neighbors, etc. The machine learning model implemented by scheduler 116 may select the deduplication option based on previous deduplication option selections, historic deduplication ratios, backup time, etc.

Scheduler 116 selects an object and determines whether a historical size associated with the object is greater than a threshold size. In some embodiments, the threshold size is a static threshold. In some embodiments, the threshold size is a dynamic threshold. In response to a determination that the historical size associated with the object is not greater than the threshold size, a first deduplication option (e.g., no source side deduplication) is selected. For an object associated with the first deduplication option, storage system 112 requests source system 102 to provide data associated with the object (e.g., object metadata, object content data) to storage system 112.

In response to a determination that the historical size associated with the object is greater than the threshold size, scheduler 116 determines an object identifier and provides the object identifier to file system manager 117. Scheduler 116 maintains statistics for each of the backed-up objects (individually and cumulatively), and each version of a backed-up object. The statistics may be based on a data change pattern. For example, scheduler 116 maintains an average (e.g., average, running average) of the number of mismatched ranges associated with the object, a percentage of mismatched ranges associated with different backed up versions of the object, etc.

A historical percentage of mismatched ranges for the object (e.g., an average) is determined and compared to a threshold percentage. In response to a determination that the historical percentage of mismatched ranges for the object is greater than the threshold percentage, a second deduplication option is selected. In some embodiments, scheduler 116 selects the second deduplication option for particular types of backup jobs (e.g., workloads that shift the data). The particular types of backup jobs may be specified by an administrator associated with storage system 112.

The data change pattern may be detected by using a rolling hash algorithm. In some embodiments, the detected data change pattern associated with the object includes one or more mismatched ranges (e.g., data overwrites and/or data insertions). In some embodiments, the detected data change pattern associated with the object includes one or more mismatched ranges and/or one or more missing ranges (e.g., data appends). In some embodiments, the detected data change pattern associated with the object includes one or more missing ranges.

For an object associated with the second deduplication option, storage system 112 requests source system 102 to perform source side deduplication by chunking the data associated with the object (e.g., the entire object) into variable-length data chunks, generating corresponding chunk identifiers for the variable-length data chunks, and sending the corresponding chunk identifiers to the storage system. In response to receiving the corresponding chunk identifiers from source system 102, storage system 112 determines from the corresponding chunk identifiers which of the variable-length data chunks are not currently stored by storage system 112 and provides to source system 102 a list of one or more chunk identifiers corresponding to data chunks that are not currently stored by storage system 112. Source system 102 subsequently provides to storage system 112 the one or more data chunks corresponding to the one or more chunk identifiers included in the list.

In response to a determination that the historical percentage of mismatched ranges for the object is not greater than the threshold percentage, storage system 112 determines whether there has historically been sufficient network bandwidth when data has been transferred from source system 102 to storage system 112. In response to a determination that there has not historically been sufficient network bandwidth when data has been transferred from source system 102 to storage system 112, a third deduplication option is selected. In response to a determination that there has historically been sufficient network bandwidth (e.g., more than a network bandwidth threshold), a fourth deduplication option is selected.

For an object associated with the third deduplication option, storage system 112 provides range information to source system 102 and requests source system 102 to perform source side deduplication by chunking the data associated with one or more determined missing ranges and/or one or more determined mismatched ranges into a plurality of variable-length data chunks, generating a plurality of data chunk identifiers corresponding to the variable-length data chunks, and providing the plurality of corresponding data chunk identifiers to the storage system.

Backup agent 104 determines whether there are one or more missing ranges and/or one or more mismatched ranges associated with the one or more objects based on the corresponding range information and determines whether source system 102 has sufficient resources to perform source side deduplication as requested by storage system 112. In response to a determination that source system 102 has sufficient resources, backup agent 104 performs the third deduplication option as requested by storage system 112 by chunking the data associated with one or more determined missing ranges and/or one or more determined mismatched ranges into a plurality of variable-length data chunks, generating a plurality of corresponding data chunk identifiers, and providing the plurality of corresponding data chunk identifiers to storage system 112. In some embodiments, backup agent 104 compares the plurality of generated data chunk identifiers to the one or more data chunk identifiers corresponding to the one or more data chunks associated with the one or more determined ranges included in the received range information and provides one or more corresponding data chunk identifiers not included in the received range information.

In response, file system manager 117 compares the received data chunk identifiers to data chunk identifiers included in the chunk metadata data structure to identify one or more of the plurality of variable-length data chunks that are not stored in a storage associated with the storage system. Storage system 112 provides to source system 102 a response that identifies among the plurality of variable-length data chunks, one or more variable-length data chunks not already stored in the storage associated with storage system 112. In some embodiments, the response identifies the one or more data chunk identifiers corresponding to variable-length data chunks not already stored in the storage associated with storage system 112. In some embodiments, the response identifies the one or more data chunk identifiers corresponding to variable-length data chunks already stored in the storage associated with storage system 112. In response, source system 102 may eliminate the one or more variable-length data chunks corresponding to the one or more identified data chunk identifiers. Subsequently, source system 102 provides content of the one or more variable-length data chunks not already stored in the storage associated with storage system 112. Storage system 112 receives and stores the content of the one or more variable-length data chunks not already stored in the storage associated with storage system 112.

In response to a determination that source system 102 does not have sufficient resources, backup agent 104 performs a fourth deduplication option (no source side deduplication for the one or more determined missing ranges and/or the one or more determined mismatched ranges) instead of performing the third deduplication option as requested by storage system 112 and provides to storage system 112 content associated with the one or more determined missing ranges and/or the one or more determined mismatched ranges.

Storage system 112 receives from source system 102 backup data associated with the one or more objects. In some embodiments, the received backup data associated with the one or more objects includes one or more data chunks associated with the one or more objects. Storage system 112 ingests and stores the one or more data chunks associated with the one or more objects.

In some embodiments, the received backup data associated with the one or more objects includes content data associated with the one or more objects. Storage system 112 ingests the backup data associated with the one or more objects and may perform in-line deduplication, post-processing deduplication, or a combination of partial in-line deduplication and partial post-processing deduplication on the data associated with the object.

For an object associated with the fourth deduplication option, storage system 112 provides to source system 102 range information associated with the object and a request to provide data associated with one or more missing ranges and/or one or more mismatched ranges. In response, source system 102 determines one or more missing ranges and/or one or more mismatched ranges based on the received range information and provides to storage system 112 the data associated with the one or more determined missing ranges and/or one or more determined mismatched ranges.

In a second technique, scheduler 116 provides to file system manager 117 a corresponding object identifier for each of the one or more objects. File system manager 117 utilizes the corresponding object identifier to determine corresponding range information associated with the one or more objects.

Source system 102 includes backup agent 104. A backup of the one or more objects 103 may be subject to a service-level objective (e.g., a time constraint of 3-5 hours). The backup of the one or more objects 103 may not be able to be completed due to one or more conditions, such as resource availability (e.g., CPU utilization at the source system, network bandwidth, etc.), data change rate, distribution of data change across objects, data change within objects (e.g., append only, insertion only, append and insertion, etc.), object size, etc. Using the second technique, backup agent 104 may adaptively select a deduplication option from a plurality of deduplication options to utilize when backing up the one or more objects based on the one or more conditions. This may enable the backup to be completed within the time constraint.

Backup agent 104 may select a corresponding deduplication option from a plurality of deduplication options to utilize when backing up the one or more objects 103 based on the one or more conditions.

In response to receiving the request and corresponding range information for the one or more objects associated with the source system, backup agent 104 selects one of the one or more objects and determines a size of the object. Backup agent 104 determines whether the object size is greater than a threshold size.

In some embodiments, the object size is not greater than the threshold size. In response to a determination that the object size is not greater than the threshold size, backup agent 104 selects a first deduplication option for the object where source side deduplication is not required for the object. For an object associated with the first deduplication option, source system 102 sends the data associated with the object to storage system 112. Storage system 112 ingests the data associated with the object and may perform in-line deduplication, post-processing deduplication, or a combination of partial in-line deduplication and partial post-processing deduplication on the data associated with the object.

In some embodiments, for an object having a size that is not greater than the threshold size, backup agent 104 sends the data associated with the object when a full backup of the object is performed. In some embodiments, for an object having a size that is not greater than the threshold size, backup agent 104 sends the data associated with the object that has changed since a previous backup when an incremental backup of the object is performed.

For an object having a size greater than the threshold size, backup agent 104 may a second deduplication option, a third deduplication option, or a fourth deduplication option.

In some embodiments, backup agent 104 selects a second deduplication option. For an object associated with the second deduplication option, source system 102 chunks the object data into variable-length data chunks, generates corresponding chunk identifiers for the variable-length data chunks, and sends the corresponding chunk identifiers to storage system 112. In response, storage system 112 determines from the corresponding chunk identifiers which of the variable-length data chunks are not currently stored by storage system 112 and provides to source system 102 a list of one or more chunk identifiers corresponding to data chunks that are not currently stored by storage system 112. Source system 102 subsequently provides to the storage system the one or more data chunks corresponding to the one or more chunk identifiers included in the list.

In some embodiments, backup agent 104 selects a third deduplication option. For an object associated with the third deduplication option, backup agent 104 chunks the data associated with one or more determined missing ranges and/or one or more determined mismatched ranges into a plurality of variable-length data chunks, generates a plurality of corresponding data chunk identifiers, and provides the plurality of corresponding data chunk identifiers to storage system 112. In some embodiments, the backup agent compares the plurality of generated data chunk identifiers to the one or more data chunk identifiers corresponding to the one or more data chunks associated with the one or more determined ranges included in the received range information and provides one or more corresponding data chunk identifiers not included in the received range information. In response, file system manager 117 compares the received data chunk identifiers to data chunk identifiers included in the chunk metadata data structure included in metadata store 114 to identify one or more of the plurality of variable-length data chunks that are not stored in a storage associated with storage system 112. Storage system 112 provides to source system 102 a response that identifies among the plurality of variable-length data chunks, one or more variable-length data chunks not already stored in the storage associated with storage system 112. In some embodiments, the response identifies the one or more data chunk identifiers corresponding to variable-length data chunks not already stored in the storage associated with storage system 112. In some embodiments, the response identifies the one or more data chunk identifiers corresponding to variable-length data chunks already stored in the storage associated with storage system 112. In response, source system 102 may eliminate the one or more variable-length data chunks corresponding to the one or more identified data chunk identifiers. Subsequently, source system 102 provides content of the one or more variable-length data chunks not already stored in the storage associated with storage system 112. Storage system 112 receives and stores the content of the one or more variable-length data chunks not already stored in the storage associated with storage system 112.

In some embodiments, backup agent 104 selects a fourth deduplication option. For an object associated with the fourth deduplication option, source system 102 provides to storage system 112 content associated with the one or more determined missing and/or mismatched ranges. In response, storage system 112 ingests the content associated with the one or more determined missing and/or mismatched ranges. In some embodiments, storage system 112 performs in-line deduplication on the ingested data. In some embodiments, storage system 112 stores the ingested data and performs post-processing deduplication on the stored data. In some embodiments, storage system 112 performs partial in-line deduplication and partial post-processing deduplication on the ingested data.

The deduplication option for an object may be the same or different as one or more other objects. For example, backup agent 104 may select the third deduplication option for a first object and a second object, and select the first deduplication option for a third object.

FIG. 2A is a flow diagram illustrating a process for selecting a source side deduplication option in accordance with some embodiments. In the example shown, process 200 is implemented by a storage system, such as storage system 112.

At 202, a backup of one or more objects associated with a source system is determined to be performed. A storage system includes a scheduler. The scheduler may determine that a backup of the one or more objects associated with the source system is to be performed according to one or more backup policies. In some embodiments, a backup policy indicates that the one or more objects are to be backed up on a periodic basis (e.g., hourly, daily, weekly, monthly, etc.), in response to a command from a user, etc. In some embodiments, a full backup of the one or more objects associated with the source system is determined to be performed. In some embodiments, an incremental backup of the one or more objects associated with the source system is determined to be performed.

At 204, a corresponding deduplication option among a plurality of deduplication options to utilize when a backup of the one or more objects is performed based on one or more conditions is selected. In some embodiments, a first deduplication option is selected. The scheduler determines whether a historical size associated with an object is greater than a threshold size. In some embodiments, the threshold size is a static threshold. In some embodiments, the threshold size is a dynamic threshold. In response to a determination that the historical size associated with the object is not greater than the threshold size, the scheduler selects a first deduplication option (e.g., no source side deduplication) for the object.

In some embodiments, a second deduplication option is selected. For an object having a historical size greater than the threshold size, the scheduler determines a historical number of mismatched ranges for the object, determines whether a historical percentage of mismatched ranges for the object is greater than a threshold percentage, and selects the second deduplication option in response to a determination that the historical percentage of mismatched ranges for the object is greater than the threshold percentage.

In some embodiments, a third deduplication option is selected. In response to a determination that the historical percentage of mismatched ranges for the object is not greater than the threshold percentage and there has not historically been sufficient network bandwidth when data has been transferred from the source system to the storage system, the scheduler selects a third deduplication option.

In some embodiments, a fourth deduplication option is selected. In response to a determination that the historical percentage of mismatched ranges for the object is not greater than the threshold percentage and there has historically been sufficient network bandwidth when data has been transferred from the source system to the storage system, the scheduler selects the fourth deduplication option.

At 206, a request to back up the one or more objects according to the corresponding selected deduplication option is provided to a source system.

For an object associated with the first deduplication option, the storage system requests the source system to provide data associated with the object (e.g., object metadata, object content data) to the storage system.

For an object associated with the second deduplication option, the storage system requests the source system to perform source side deduplication by chunking the data associated with the object into variable-length data chunks, generating corresponding chunk identifiers for the variable-length data chunks, and sending the corresponding chunk identifiers to the storage system. In response, the storage system determines from the corresponding chunk identifiers which of the variable-length data chunks are not currently stored by the storage system and provides to the source system a list of one or more chunk identifiers corresponding to data chunks that are not currently stored by the storage system. The source system subsequently provides to the storage system the one or more data chunks corresponding to the one or more chunk identifiers included in the list.

For an object associated with the third deduplication option, the storage system provides range information associated with the object to the source system and requests the source system to perform source side deduplication by chunking the data associated with one or more determined missing ranges and/or one or more determined mismatched ranges into a plurality of variable-length data chunks, generating a plurality of data chunk identifiers corresponding to the variable-length data chunks, and providing the plurality of corresponding data chunk identifiers to the storage system.

The source system includes a backup agent that determines whether there are one or more missing ranges and/or one or more mismatched ranges associated with the one or more objects based on the corresponding range information. For the one or more determined missing ranges and/or one or more mismatched ranges, the backup agent may subsequently chunk the data associated with one or more determined missing ranges and/or one or more determined mismatched ranges into a plurality of variable-length data chunks, generate a plurality of corresponding data chunk identifiers, and provide the plurality of corresponding data chunk identifiers to the storage system. In some embodiments, the backup agent compares the plurality of generated data chunk identifiers to the one or more data chunk identifiers corresponding to the one or more data chunks associated with the one or more determined ranges included in the received range information and provides one or more corresponding data chunk identifiers not included in the received range information.

In response, the file system manager of the storage system compares the received data chunk identifiers to data chunk identifiers included in the chunk metadata data structure to identify one or more of the plurality of variable-length data chunks that are not stored in a storage associated with the storage system. The storage system provides to the source system a response that identifies among the plurality of variable-length data chunks, one or more variable-length data chunks not already stored in the storage associated with the storage system. In some embodiments, the response identifies the one or more data chunk identifiers corresponding to variable-length data chunks not already stored in the storage associated with the storage system. In some embodiments, the response identifies the one or more data chunk identifiers corresponding to variable-length data chunks already stored in the storage associated with the storage system. In response, the source system may eliminate the one or more variable-length data chunks corresponding to the one or more identified data chunk identifiers. Subsequently, the source system provides content of the one or more variable-length data chunks not already stored in the storage associated with the storage system. The storage system receives and stores the content of the one or more variable-length data chunks not already stored in the storage associated with the storage system.

In some embodiments, the source system does not have sufficient resources to perform the third deduplication option. Instead, the source system provides content associated with the one or more determined mismatched ranges and/or one or more missing ranges.

For an object associated with the fourth deduplication option, the storage system provides to the source system range information associated with the object and a request to provide data associated with one or more missing ranges and/or one or more mismatched ranges. In response, the source system determines one or more missing ranges and/or one or more mismatched ranges based on the received range information and provides to the storage system the data associated with the one or more determined missing ranges and/or one or more determined mismatched ranges.

At 208, data associated with the one or more objects is received from the source system and backed up. In some embodiments, the received backup data associated with the one or more objects includes one or more data chunks associated with the one or more objects. The storage system ingests and stores the one or more data chunks associated with the one or more objects.

In some embodiments, the received backup data associated with the one or more objects includes content data associated with the one or more objects. The storage system ingests the backup data associated with the one or more objects and may perform in-line deduplication, post-processing deduplication, or a combination of partial in-line deduplication and partial post-processing deduplication on the data associated with the object.

Figure 2B:
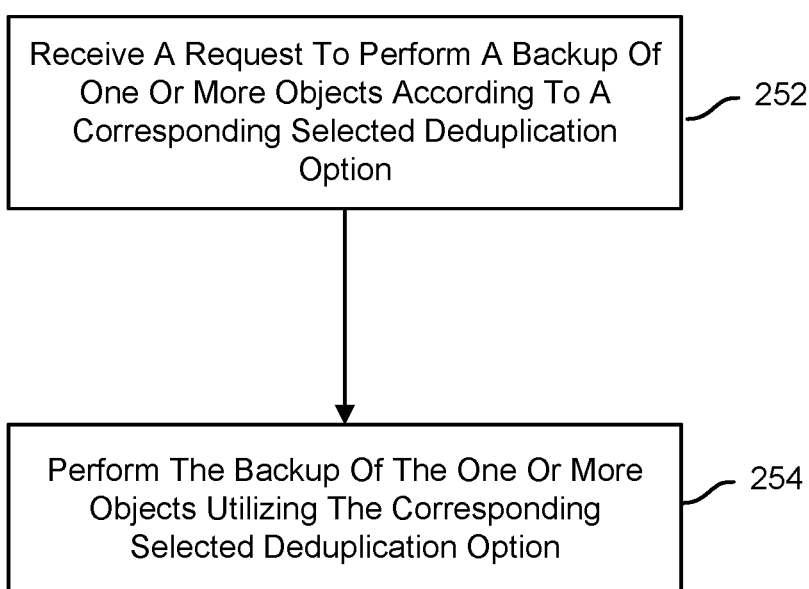
FIG. 2B is a flow diagram illustrating a process for performing source side deduplication in accordance with some embodiments.

FIG. 2B is a flow diagram illustrating a process for performing source side deduplication in accordance with some embodiments. In the example shown, process 250 may be implemented by a source system, such as source system 102.

At 252, a request to perform a backup of one or more objects according to a corresponding selected deduplication option is received.

In some embodiments, a request to perform source side deduplication according to a first deduplication option for an object is received.

In some embodiments, a request to perform source side deduplication according to a second deduplication option for an object is received.

In some embodiments, a request to perform source side deduplication according to a third deduplication option for an object is received.

In some embodiments, a request to perform source side deduplication according to a fourth deduplication option for an object is received.

At 254, a backup of the one or more objects utilizing the corresponding selected deduplication option is performed.

In response to a request to back up an object according to a first deduplication option, a backup agent determines whether a current size of the object is greater than a threshold size. In response to a determination that the current size of the object is not greater than the threshold size, the source system provides data associated with the object to the storage system. In response to a determination that the current size of the object is greater than the threshold size, the backup agent determines whether the source system has sufficient resources to perform source side deduplication for the object. In response to a determination that the source system does not have sufficient resources to perform source side deduplication for the object, the source system provides data associated with the object to the storage system. In response to a determination that the source system has sufficient resources to perform source side deduplication for the object, the source system chunks the data associated with the object into variable-length data chunks, generates corresponding chunk identifiers for the variable-length data chunks, and provides the corresponding chunk identifiers to the storage system. In response, the storage system determines from the corresponding chunk identifiers which of the variable-length data chunks are not currently stored by the storage system and provides to the source system a list of one or more chunk identifiers corresponding to data chunks that are not currently stored by the storage system. The source system subsequently provides to the storage system the one or more data chunks corresponding to the one or more chunk identifiers included in the list.

In response to a request to back up an object according to a second deduplication option, the backup agent chunks the data associated with the object into variable-length data chunks, generates corresponding chunk identifiers for the variable-length data chunks, and provides the corresponding chunk identifiers to the storage system. In response, the storage system determines from the corresponding chunk identifiers which of the variable-length data chunks that are not currently stored by the storage system and provides to the source system a list of one or more chunk identifiers corresponding to data chunks that are not currently stored by the storage system. The source system subsequently provides to the storage system the one or more data chunks corresponding to the one or more chunk identifiers included in the list.

In response to a request to back up an object according to a third deduplication option, the backup agent determines whether there are one or more missing ranges and/or one or more mismatched ranges associated with the one or more objects based on the corresponding range information and whether the source system has sufficient resources to perform source side deduplication according to the third deduplication option. In response to a determination that the source system has sufficient resources, the backup agent performs the third deduplication option as requested by the storage system by chunking the data associated with one or more determined missing ranges and/or one or more determined mismatched ranges into a plurality of variable-length data chunks, generating a plurality of corresponding data chunk identifiers, and providing the plurality of corresponding data chunk identifiers to the storage system. In some embodiments, the backup agent compares the plurality of generated data chunk identifiers to the one or more data chunk identifiers corresponding to the one or more data chunks associated with the one or more determined ranges included in the received range information and provides one or more corresponding data chunk identifiers not included in the received range information.

In response, the file system manager of the storage system compares the received data chunk identifiers to data chunk identifiers included in the chunk metadata data structure to identify one or more of the plurality of variable-length data chunks that are not stored in a storage associated with the storage system. The storage system provides to the source system a response that identifies among the plurality of variable-length data chunks, one or more variable-length data chunks not already stored in the storage associated with the storage system. In some embodiments, the response identifies the one or more data chunk identifiers corresponding to variable-length data chunks not already stored in the storage associated with the storage system. In some embodiments, the response identifies the one or more data chunk identifiers corresponding to variable-length data chunks already stored in the storage associated with the storage system. In response, the source system may eliminate the one or more variable-length data chunks corresponding to the one or more identified data chunk identifiers. Subsequently, the source system provides content of the one or more variable-length data chunks not already stored in the storage associated with the storage system. The storage system receives and stores the content of the one or more variable-length data chunks not already stored in the storage associated with the storage system. Performing source side deduplication according to the third deduplication option requires less CPU resources and less bandwidth to transmit data between the source system and the storage system when compared with performing source side deduplication in a manner described in the background of the invention.

In response to a determination that the source system does not have sufficient resources, the backup agent performs a fourth deduplication option (no source side deduplication for the one or more determined missing ranges and/or the one or more determined mismatched ranges) instead of performing the third deduplication option as requested by the storage system and provides to the storage system content associated with the one or more determined missing ranges and/or the one or more determined mismatched ranges.

In response to a request to back up an object according to a third deduplication option, the source system determines one or more missing ranges and/or one or more mismatched ranges based on the received range information and provides to the storage system the data associated with the one or more determined missing ranges and/or one or more determined mismatched ranges.

Figure 3:
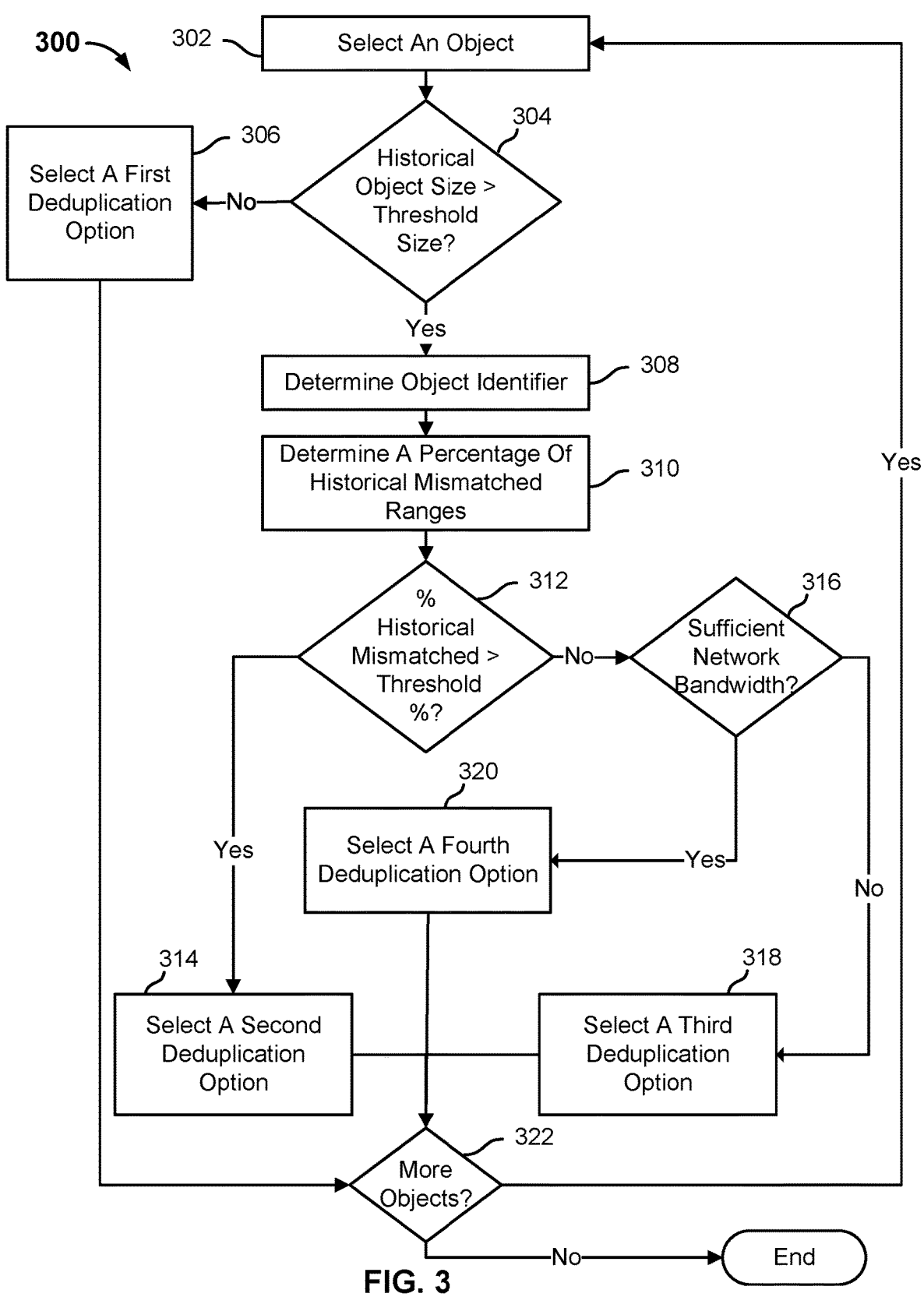
FIG. 3 is a flow diagram illustrating a process for selecting a deduplication option in accordance with some embodiments.

FIG. 3 is a flow diagram illustrating a process for selecting a deduplication option in accordance with some embodiments. In the example shown, process 300 may be implemented by a storage system, such as storage system 112. In some embodiments, process 300 is implemented to perform some or all of step 204 of process 200.

At 302, an object is selected.

At 304, it is determined whether a historical size associated with the object is greater than a threshold size. In some embodiments, the threshold size is a static threshold. In some embodiments, the threshold size is a dynamic threshold.

In response to a determination that the historical size associated with the object is not greater than the threshold size, process 300 proceeds to 306. In response to a determination that the historical size associated with the object is greater than the threshold size, process 300 proceeds to 308.

At 306, a first deduplication option is selected. For an object associated with the first deduplication option, the storage system requests the source system to provide data associated with the object (e.g., object metadata, object content data) to the storage system.

At 308, an object identifier is determined.

At 310, a percentage of historical mismatched ranges for the object having the object identifier are determined. The storage system maintains statistics for an object, such as a number of mismatched ranges, a ratio of mismatched ranges to the total number of ranges, an average number of (running average or other average) mismatched ranges per backup, a percentage of mismatched ranges associated with different backed up versions of the object, etc.

At 312, it is determined whether the percentage of historical mismatched ranges is greater than a threshold percentage. In some embodiments, the threshold percentage is a static percentage. In some embodiments, the threshold percentage is a dynamic percentage.

In response to a determination that the percentage of historical mismatched ranges is greater than the threshold percentage, process 300 proceeds to 314. In response to a determination that the percentage of historical mismatched ranges is not greater than the threshold percentage, process 300 proceeds to 316.

At 314, a second deduplication option is selected. For an object associated with the second deduplication option, the storage system requests the source system to perform source side deduplication by chunking the data associated with the object into variable-length data chunks, generating corresponding chunk identifiers for the variable-length data chunks, and sending the corresponding chunk identifiers to the storage system. In response to receiving the corresponding chunk identifiers, the storage system determines from the corresponding chunk identifiers which of the variable-length data chunks are not currently stored by the storage system and provides to the source system a list of one or more chunk identifiers corresponding to data chunks that are not currently stored by the storage system. The source system subsequently provides to the storage system the one or more data chunks corresponding to the one or more chunk identifiers included in the list.

At 316, it is determined whether there has historically been sufficient network bandwidth when data has been transferred from the source system to the storage system. In response to a determination that there has not historically been sufficient network bandwidth when data has been transferred from the source system to the storage system, process 300 proceeds to 320. In response to a determination that there has historically been sufficient network bandwidth (e.g., more than a network bandwidth threshold), process 300 proceeds to 318. In some embodiments, step 316 is optional. In such embodiments, step 320 is optional and process 300 proceeds from 312 to 318.

At 318, a third deduplication option is selected. For an object associated with the third deduplication option, the storage system provides range information to the source system and requests the source system to perform source side deduplication by chunking the data associated with one or more determined missing ranges and/or one or more determined mismatched ranges into a plurality of variable-length data chunks, generating a plurality of data chunk identifiers corresponding to the variable-length data chunks, and providing the plurality of corresponding data chunk identifiers to the storage system.

The source system includes a backup agent that determines whether there are one or more missing ranges and/or one or more mismatched ranges associated with the one or more objects based on the corresponding range information. For the one or more determined missing ranges and/or one or more mismatched ranges, the backup agent may subsequently chunk the data associated with one or more determined missing ranges and/or one or more determined mismatched ranges into a plurality of variable-length data chunks, generate a plurality of corresponding data chunk identifiers, and provide the plurality of corresponding data chunk identifiers to the storage system. In some embodiments, the backup agent compares the plurality of generated data chunk identifiers to the one or more data chunk identifiers corresponding to the one or more data chunks associated with the one or more determined ranges included in the received range information and provides one or more corresponding data chunk identifiers not included in the received range information.

In response, the file system manager of the storage system compares the received data chunk identifiers to data chunk identifiers included in the chunk metadata data structure to identify one or more of the plurality of variable-length data chunks that are not stored in a storage associated with the storage system. The storage system provides to the source system a response that identifies among the plurality of variable-length data chunks, one or more variable-length data chunks not already stored in the storage associated with the storage system. In some embodiments, the response identifies the one or more data chunk identifiers corresponding to variable-length data chunks not already stored in the storage associated with the storage system. In some embodiments, the response identifies the one or more data chunk identifiers corresponding to variable-length data chunks already stored in the storage associated with the storage system. In response, the source system may eliminate the one or more variable-length data chunks corresponding to the one or more identified data chunk identifiers. Subsequently, the source system provides content of the one or more variable-length data chunks not already stored in the storage associated with the storage system. The storage system receives and stores the content of the one or more variable-length data chunks not already stored in the storage associated with the storage system.

At 320, a fourth deduplication option is selected. For an object associated with the fourth deduplication option, the storage system provides to the source system range information associated with the object and a request to provide data associated with one or more missing ranges and/or one or more mismatched ranges. In response, the source system determines one or more missing ranges and/or one or more mismatched ranges based on the received range information and provides to the storage system the data associated with the one or more determined missing ranges and/or one or more determined mismatched ranges.

At 322, it is determined whether there are more objects for which a deduplication option needs to be selected. In response to a determination that there are more objects for which a deduplication option needs to be selected, process 300 returns to step 302. In response to a determination that there are no more objects for which a deduplication option needs to be selected, process 300 ends.

Figure 4A:
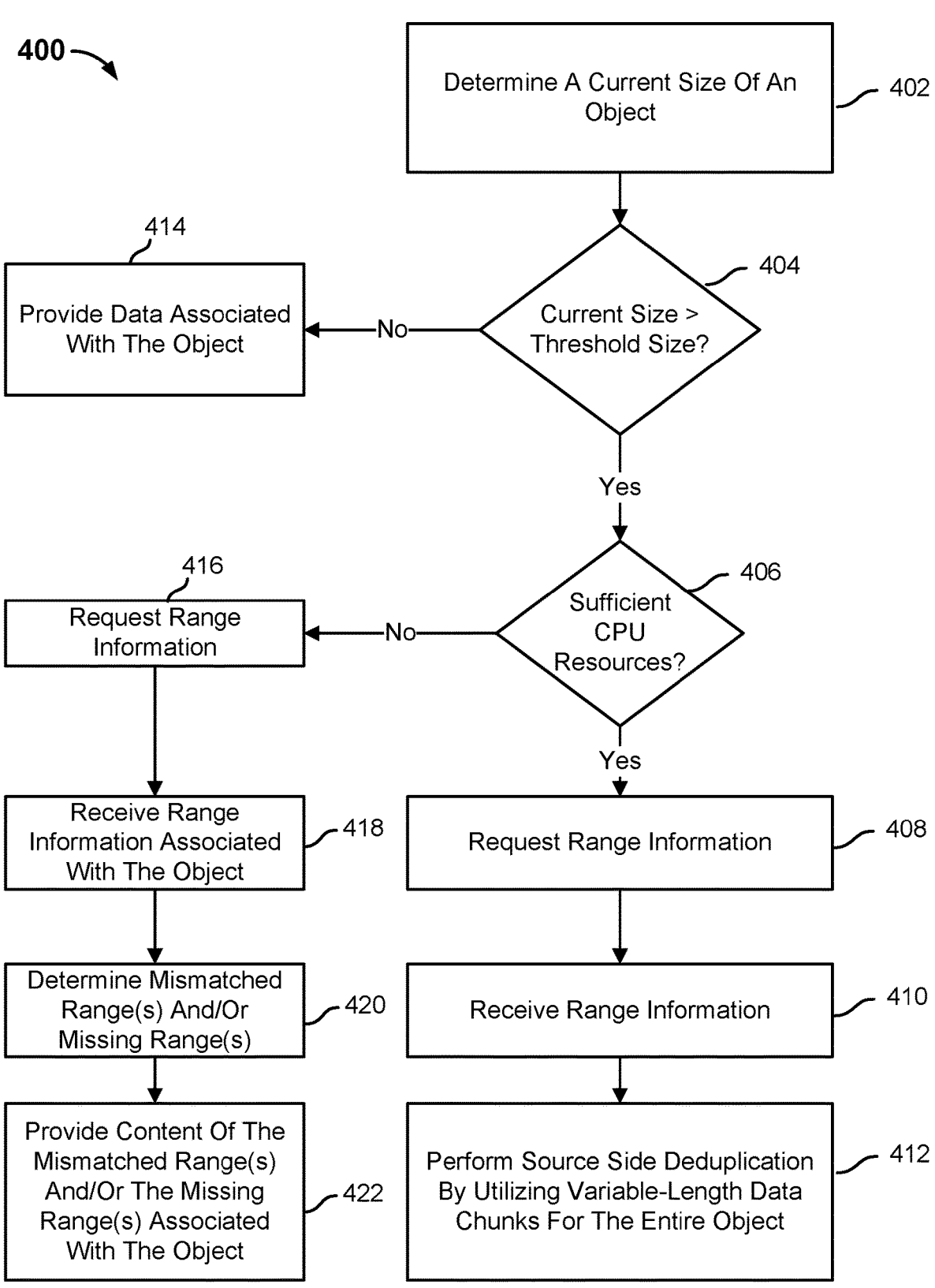
FIG. 4A is a flow diagram illustrating a process for performing source side deduplication in accordance with some embodiments.

FIG. 4A is a flow diagram illustrating a process for performing source side deduplication in accordance with some embodiments. In the example shown, process 400 may be implemented by a source system, such as source system 102. In some embodiments, process 400 is implemented to perform some or all of step 254 of process 250.

At 402, a current size of an object is determined.

At 404, it is determined whether the current size of the object is greater than a threshold size. In response to a determination that the current size of the object is greater than the threshold size, process 400 proceeds to 406. In response to a determination that the current size of the object is not greater than the threshold size, process 400 proceeds to 414.

At 406, it is determined whether the source system has sufficient CPU resources to perform source side deduplication. In response to a determination that the source system has sufficient CPU resources to perform source side deduplication (e.g., more than a CPU threshold), process 400 proceeds to 408. In response to a determination that the source system does not have sufficient CPU resources to perform source side deduplication, process 400 proceeds to 416.

At 408, range information is requested from the storage system.

At 410, range information is received from the storage system.

At 412, source side deduplication is performed for the object by utilizing variable-length data chunks. The source system utilizes the received range information to chunk the data associated with the object into variable-length data chunks. The source system then generates corresponding chunk identifiers for the variable-length data chunks and provides the corresponding chunk identifiers to the storage system. In response, the storage system determines from the corresponding chunk identifiers which of the variable-length data chunks are not currently stored by the storage system and provides to the source system a list of one or more chunk identifiers corresponding to data chunks that are not currently stored by the storage system. The source system subsequently provides to the storage system the one or more data chunks corresponding to the one or more chunk identifiers included in the list.

At 414, data associated with the object is provided to a storage system.

At 416, range information is requested from the storage system.

At 418, range information is received from the storage system.

At 420, one or more mismatched and/or one or more missing ranges are determined.

At 422, content of the one or more determined mismatched ranges and/or the one or more determined missing ranges is provided.

Figure 4B:
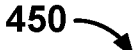
FIG. 4B is a flow diagram illustrating a process for performing source side deduplication in accordance with some embodiments.

FIG. 4B is a flow diagram illustrating a process for performing source side deduplication in accordance with some embodiments. In the example shown, process 450 may be implemented by a source system, such as source system 102. In some embodiments, process 450 is implemented to perform some or all of step 254 of process 250.

At 452, range information associated with the object is received. Range information for an object includes one or more range chunk identifiers, a corresponding offset for each of the one or more range chunk identifiers, and a corresponding length for the one or more data chunks associated with a range chunk identifier for each of the one or more range chunk identifiers. In some embodiments, the range information for an object includes one or more data chunk identifiers corresponding to the one or more data chunks associated with a range chunk identifier for each of the one or more range chunk identifiers.

At 454, one or more mismatched ranges and/or one or more missing ranges associated with the object are determined. The backup agent may determine that there is a missing range in response to a determination that the received range information does not cover the missing range. The backup agent may determine that a mismatched range exists by comparing the range chunk identifier included in the received range information associated with a portion of an object to a current range chunk identifier corresponding to the portion of the object. A mismatched range exists for a portion of an object when the range chunk identifier included in the received range information associated with the portion of the object does not match the current range chunk identifier corresponding to the portion of the object.

At 456, it is determined whether the source system has sufficient CPU resources to perform source side deduplication for the one or more determined mismatched ranges and/or the one or more determined missing ranges. In response to a determination that the source system has sufficient resources (e.g., more than a CPU threshold), process 450 proceeds to 458. In response to a determination that the source system does not have sufficient resources, process 450 proceeds to 460.

At 458, source side deduplication for the one or more determined mismatched ranges and/or the one or more determined missing ranges associated with the object is performed. For the one or more determined missing ranges and/or one or more mismatched ranges, the backup agent may subsequently chunk the data associated with one or more determined missing ranges and/or one or more determined mismatched ranges into a plurality of variable-length data chunks, generate a plurality of corresponding data chunk identifiers, and provide the plurality of corresponding data chunk identifiers to the storage system. In some embodiments, the backup agent compares the plurality of generated data chunk identifiers to the one or more data chunk identifiers corresponding to the one or more data chunks associated with the one or more determined ranges included in the received range information and provides one or more corresponding data chunk identifiers not included in the received range information.

In response, the file system manager of the storage system compares the received data chunk identifiers to data chunk identifiers included in the chunk metadata data structure to identify one or more of the plurality of variable-length data chunks that are not stored in a storage associated with the storage system. The storage system provides to the source system a response that identifies among the plurality of variable-length data chunks, one or more variable-length data chunks not already stored in the storage associated with the storage system. In some embodiments, the response identifies the one or more data chunk identifiers corresponding to variable-length data chunks not already stored in the storage associated with the storage system. In some embodiments, the response identifies the one or more data chunk identifiers corresponding to variable-length data chunks already stored in the storage associated with the storage system. In response, the source system may eliminate the one or more variable-length data chunks corresponding to the one or more identified data chunk identifiers. Subsequently, the source system provides content of the one or more variable-length data chunks not already stored in the storage associated with the storage system. The storage system receives and stores the content of the one or more variable-length data chunks not already stored in the storage associated with the storage system.

At 460, content of the one or more determined mismatched ranges and/or the one or more determined missing ranges associated with the object is provided to the storage system.

FIG. 5A is a flow diagram illustrating a process for reducing the amount of data received from a source system during a backup in accordance with some embodiments. In the example shown, process 500 is implemented by a storage system, such as storage system 112. In some embodiments, process 500 may be implemented to perform some of the deduplication option selected at step 318 of process 300.

At 502, range information associated with the one or more objects is determined. The storage system includes a file system manager. The scheduler provides to the file system manager a corresponding object identifier for each of the one or more objects. The file system manager utilizes the corresponding object identifier to determine corresponding range information associated with the one or more objects. Range information for an object includes one or more range chunk identifiers, a corresponding offset for each of the one or more range chunk identifiers, and a corresponding length for the one or more data chunks associated with a range chunk identifier for each of the one or more range chunk identifiers. Each range chunk identifier corresponds to a particular range of an object and represents one or more data chunks included in the particular range of the object. In some embodiments, the range information for an object includes one or more data chunk identifiers corresponding to the one or more data chunks associated with a range chunk identifier for each of the one or more range chunk identifiers.

At 504, the range information associated with the one or more objects is provided to a source system.

At 506, one or more data chunk identifiers corresponding to one or more variable-length data chunks are received. The source system includes a backup agent. In response to receiving the corresponding range information for the one or more objects to the source system, the backup agent determines whether there are one or more missing ranges and/or one or more mismatched ranges associated with the one or more objects based on the corresponding range information.

For each of the one or more determined ranges, the backup agent chunks the data into a plurality of variable-length data chunks, generates a plurality of corresponding data chunk identifiers, and provides the plurality of corresponding data chunk identifiers to the storage system. In some embodiments, the backup agent compares the plurality of generated data chunk identifiers to the one or more data chunk identifiers corresponding to the one or more data chunks associated with the one or more determined ranges included in the received range information and provides one or more corresponding data chunk identifiers not included in the received range information.

At 508, it is determined whether any of the one or more data chunk identifiers are stored in a chunk metadata data structure. The backup agent may determine that a mismatched range exists by comparing the range chunk identifier included in the provided range information associated with a portion of an object to a current range chunk identifier corresponding to the portion of the object. For each of the one or more determined ranges, the backup agent chunks the data into a plurality of variable-length data chunks, generates a plurality of corresponding data chunk identifiers, and provides the plurality of corresponding data chunk identifiers to the storage system.

In response, the file system manager of the storage system compares the received data chunk identifiers to data chunk identifiers included in the chunk metadata data structure to identify one or more of the plurality of variable-length data chunks that are not stored in a storage associated with the storage system.

At 510, a response is provided. The response identifies among the plurality of variable-length data chunks, one or more variable-length data chunks not already stored in the storage associated with the storage system. In some embodiments, the response identifies the one or more data chunk identifiers corresponding to variable-length data chunks not already stored in the storage associated with the storage system. In some embodiments, the response identifies the one or more data chunk identifiers corresponding to variable-length data chunks already stored in the storage associated with the storage system.

At 512, content of the one or more variable-length data chunks not already stored in the storage associated with the storage system is received and stored.

FIG. 5B is a flow diagram illustrating a process for performing source side deduplication in accordance with some embodiments. In the example shown, process 520 is implemented by a source system, such as source system 102. In some embodiments, process 520 is implemented to perform some of the deduplication option selected at step 318 of process 300. In some embodiments, process 520 is implemented to perform step 458 of process 450.

At 522, content associated with one or more determined mismatched ranges and/or one or more determined missing ranges is chunked into a plurality of variable-length data chunks. The source system received from a storage system range information associated with one or more objects. Range information for an object includes one or more range chunk identifiers, a corresponding offset for each of the one or more range chunk identifiers, and a corresponding length for the one or more data chunks associated with a range chunk identifier for each of the one or more range chunk identifiers. Each range chunk identifier corresponds to a particular range of an object and represents one or more data chunks included in the particular range of the object. In some embodiments, the range information for an object includes one or more data chunk identifiers corresponding to the one or more data chunks associated with a range chunk identifier for each of the one or more range chunk identifiers.

The source system determined one or more missing ranges and/or one or more new ranges associated with the new objects based on the received range information. A missing range corresponds to a portion of an object that was not previously backed up. For example, there may have been data appended to the object since the previous backup. The backup agent may determine that there is a missing range in response to a determination that the received range information does not cover the missing range.

In some embodiments, a mismatched range corresponds to a portion of an object that was overwritten with new data since the previous backup. In some embodiments, a mismatched range corresponds to a portion of an object where data was inserted into the range since the previous backup. The source system may determine that a mismatched range exists by comparing the range chunk identifier included in the received range information associated with a portion of an object to a current range chunk identifier corresponding to the portion of the object. For example, the received range information may indicate that a portion of the object associated with 256 kb to 512 kb is associated with the brick identifier C123. However, the backup agent may determine that there is a mismatched range because the current range chunk identifier for the data included in the range of 256 kb to 512 kb is C456.

The content associated with one or more determined mismatched ranges and/or one or more determined missing ranges is chunked into a plurality of variable-length data chunks.

At 524, a corresponding data chunk identifier is generated for each of the variable-length data chunks.

At 526, the data chunk identifiers are provided to a storage system. In some embodiments, the source system compares the plurality of generated chunk identifiers to the one or more chunk identifiers corresponding to the one or more data chunks associated with the one or more determined ranges included in the received range information and provides to the storage system one or more corresponding chunk identifiers not included in the received range information.

At 528, a response is received. The response identifies among the plurality of variable-length data chunk identifiers generated at 524, one or more variable-length data chunks not already stored in the storage associated with the storage system. In some embodiments, the response identifies the one or more data chunk identifiers corresponding to variable-length data chunks not already stored in the storage associated with the storage system. In some embodiments, the response identifies the one or more data chunk identifiers corresponding to variable-length data chunks already stored in the storage associated with the storage system. In response, the source system may eliminate the one or more variable-length data chunks corresponding to the one or more identified data chunk identifiers.

At 530, content of one or more variable-length data chunks not already stored in a storage associated with the storage system is provided to the storage system.

Figure 5C:
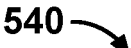
FIG. 5C is a flow diagram illustrating a process for reducing the amount of data received from a source system during a backup in accordance with some embodiments.

FIG. 5C is a flow diagram illustrating a process for reducing the amount of data received from a source system during a backup in accordance with some embodiments. In the example shown, process 540 is implemented by a storage system, such as storage system 112. In some embodiments, process 540 is implemented to perform some of the deduplication option selected at step 320 of process 300.

At 542, a backup of one or more objects associated with a source system is determined to be performed. A storage system includes a scheduler. The scheduler may determine that a backup of the one or more objects associated with the source system is to be performed according to one or more backup policies. In some embodiments, a backup policy indicates that the one or more objects are to be backed up on a periodic basis (e.g., hourly, daily, weekly, monthly, etc.), in response to a command from a user, etc. In some embodiments, a full backup of the one or more objects associated with the source system is determined to be performed. In some embodiments, an incremental backup of the one or more objects associated with the source system is determined to be performed.

At 544, range information associated with the one or more objects is determined. The storage system includes a file system manager. The scheduler provides to the file system manager a corresponding object identifier for each of the one or more objects. The file system manager utilizes the corresponding object identifier to determine corresponding range information associated with the one or more objects. Range information for an object includes one or more range chunk identifiers, a corresponding offset for each of the one or more range chunk identifiers, and a corresponding length for the one or more data chunks associated with a range chunk identifier for each of the one or more range chunk identifiers. In some embodiments, the range information for an object includes one or more data chunk identifiers corresponding to the one or more data chunks associated with a range chunk identifier for each of the one or more range chunk identifiers. The storage system provides the corresponding range information for the one or more objects to the source system.

At 546, the range information associated with the one or more objects is provided to a source system.

At 548, data associated with the one or more objects is ingested and stored. The source system determines one or more missing ranges and/or one or more new ranges associated with the new objects based on the received range information. A missing range corresponds to a portion of an object that was not previously backed up. For example, there may have been data appended to the object since the previous backup. A backup agent of the source system may determine that there is a missing range in response to a determination that the received range information does not cover the missing range.

In some embodiments, a mismatched range corresponds to a portion of an object that was overwritten with new data since the previous backup. In some embodiments, a mismatched range corresponds to a portion of an object where data was inserted into the range since the previous backup.

The backup agent may determine that a mismatched range exists by comparing the range chunk identifier included in the received range information associated with a portion of an object to a current range chunk identifier corresponding to the portion of the object. For example, the received range information may indicate that a portion of the object associated with 256 kb to 512 kb is associated with the brick identifier C123. However, the backup agent may determine that there is a mismatched range because the current range chunk identifier for the data included in the range of 256 kb to 512 kb is C456.

The source system may provide to the storage system content associated with the one or more determined missing and/or mismatched ranges. In response, the storage system ingests the content associated with the one or more determined missing and/or mismatched ranges. In some embodiments, the storage system performs in-line deduplication on the ingested data. In some embodiments, the storage system stores the ingested data and performs post-processing deduplication on the stored data. In some embodiments, the storage system performs partial in-line deduplication and partial post-processing deduplication on the ingested data.

Figure 5D:
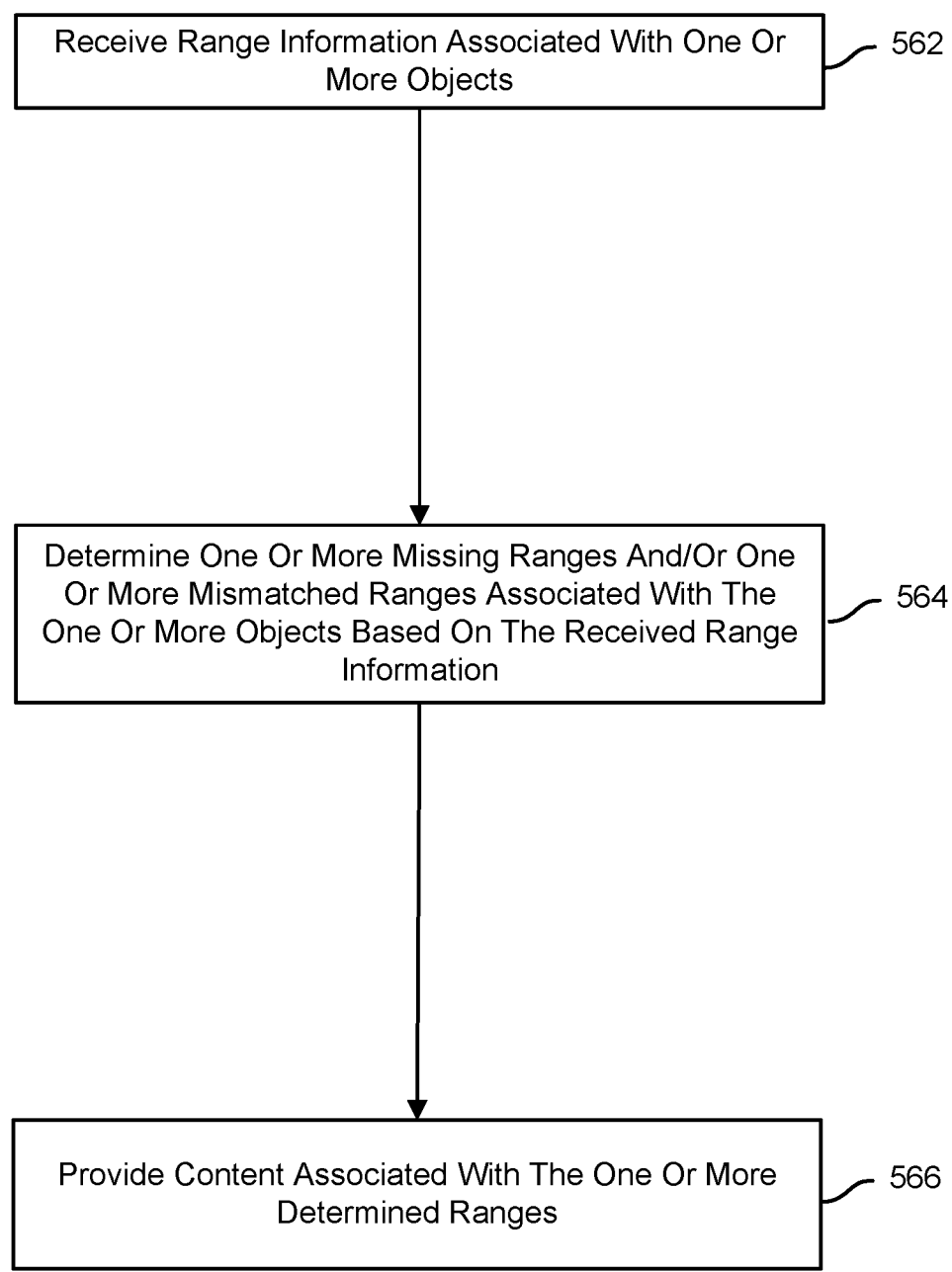
FIG. 5D is a flow diagram illustrating a process for performing a backup of a source side object in accordance with some embodiments.

FIG. 5D is a flow diagram illustrating a process for performing a backup of a source side object in accordance with some embodiments. In the example shown, process 560 is implemented by a source system, such as source system 102. In some embodiments, process 560 is implemented to perform some of the deduplication option selected at step 320 of process 300.

At 562, range information associated with one or more objects is received. Range information for an object includes one or more range chunk identifiers, a corresponding offset for each of the one or more range chunk identifiers, and a corresponding length for each of the one or more data chunks associated with the object. Each range chunk identifier corresponds to a particular range of an object and represents one or more data chunks included in the particular range of the object. In some embodiments, the range information for an object includes one or more data chunk identifiers associated with the one or more range chunk identifiers.

At 564, one or more missing ranges and/or one or more new ranges associated with the new objects are determined based on the received range information. A missing range corresponds to a portion of an object that was not previously backed up. For example, there may have been data appended to the object since the previous backup. The backup agent may determine that there is a missing range in response to a determination that the received range information does not cover the missing range.

In some embodiments, a mismatched range corresponds to a portion of an object that was overwritten with new data since the previous backup. In some embodiments, a mismatched range corresponds to a portion of an object where data was inserted into the range since the previous backup. The backup agent may determine that a mismatched range exists by comparing the range chunk identifier included in the received range information associated with a portion of an object to a current range chunk identifier corresponding to the portion of the object. For example, the received range information may indicate that a portion of the object associated with 256 kb to 512 kb is associated with the brick identifier C123. However, the backup agent may determine that there is a mismatched range because the current range chunk identifier for the data included in the range of 256 kb to 512 kb is C456.

At 566, content associated with the one or more determined ranges is provided.

Figure 6:
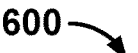
FIG. 6 is a flow diagram illustrating a process for identifying variable-length data chunks in accordance with some embodiments.

FIG. 6 is a flow diagram illustrating a process for identifying variable-length data chunks in accordance with some embodiments. In the example shown, process 600 may be implemented by a storage system, such as storage system 112. In some embodiments, process 600 is implemented to perform some or all of step 508 of process 500.

At 602, a data chunk identifier is selected.

At 604, it is determined whether the data chunk identifier is included in an entry of a chunk metadata data structure. In response to a determination that the data chunk identifier is included in an entry of a chunk metadata data structure, process 600 proceeds to 610. In response to a determination that the data chunk identifier is not included in an entry of a chunk metadata data structure, process 600 proceeds to 606.

At 606, the data chunk identifier is included in the response.

At 608, it is determined whether there are more data chunk identifiers included in the plurality of data chunk identifiers.

In response to a determination that there are more data chunk identifiers included in the received plurality of data chunk identifiers, process 600 returns to 602. In response to a determination that there are no more data chunk identifiers included in the received plurality of data chunk identifiers, process 600 ends.

At 610, the data chunk identifier is excluded from a response.

FIG. 7 is a flow diagram illustrating a process for performing a backup in accordance with some embodiments. In the example shown, process 700 is implemented by a source system, such as source system 102.

At 702, a request to perform a backup of one or more objects associated with a source system and range information associated with the one or more objects is received. A storage system includes a scheduler that determines a backup of one or more objects associated with the source system that is to be performed. The one or more objects associated with the source system may include one or more objects that were previously backed up to the storage system and/or one or more new objects that were not previously backed up to the storage system. In some embodiments, a full backup of an object is determined to be performed. In some embodiments, an incremental backup of the object is determined to be performed.

The backup system includes a file system manager. The scheduler provides to the file system manager a corresponding object identifier for each of the one or more objects. The file system manager utilizes the corresponding object identifier to determine corresponding range information associated with the one or more objects.

Range information for an object includes one or more range chunk identifiers, a corresponding offset for each of the one or more range chunk identifiers, and a corresponding length for the one or more data chunks associated with a range chunk identifier for each of the one or more range chunk identifiers. In some embodiments, the range information for an object includes one or more data chunk identifiers corresponding to the one or more data chunks associated with a range chunk identifier for each of the one or more range chunk identifiers. The storage system sends to the source system a request to back up the one or more objects and provides the corresponding range information for the one or more objects.

At 704, a corresponding deduplication option among a plurality of deduplication options to utilize when backing up the one or more objects is selected based on one or more conditions. The one or more conditions may include resource availability (e.g., CPU utilization at the source system, network bandwidth, etc.), data change rate, distribution of data change across objects, data change within objects (e.g., append only, insertion only, append and insertion, etc.), object size, etc.

The source system includes a backup agent. In response to receiving the request and corresponding range information for the one or more objects associated with the source system, the backup agent selects one of the one or more objects and determines a size of the object. The backup agent determines whether the object size is greater than a threshold size. In response to a determination that the object size is not greater than the threshold size, the backup agent selects a first deduplication option for the object where source side deduplication is not required for the object.

For an object having a size greater than the threshold size, the backup agent may determine whether there are one or more missing ranges and/or one or more mismatched ranges associated with the one or more objects based on the corresponding range information.

In some embodiments, the backup agent selects for an object having a size greater than the threshold size a second deduplication option where source side deduplication is performed for the entire object in response to a determination that a percentage of the mismatched ranges associated with the object is greater than the threshold percentage.

In some embodiments, the backup agent selects for an object having a size greater than the threshold size, a third deduplication option where source side deduplication is performed for the one or more determined missing ranges and/or one or more determined mismatched ranges associated with the object in response to a determination that a percentage of the mismatched ranges associated with the object is not greater than the threshold percentage and the source system has sufficient resources (e.g., less than a threshold amount of resources are being used by the source system) to perform the backup using source side deduplication.

In some embodiments, the backup agent selects for an object having a size greater than the threshold size, a fourth deduplication option where source side deduplication is not performed for the one or more determined missing ranges and/or one or more determined mismatched ranges associated with the object in response to a determination that a percentage of the mismatched ranges associated with the object is not greater than the threshold percentage and the source system does not have sufficient resources (e.g., more than the threshold amount of resources is being used by the source system) to perform the backup using source side deduplication. Instead, the source system provides to the storage system content associated with the one or more determined missing and/or mismatched ranges.

In some embodiments, the deduplication option is selected by a machine learning model. The machine learning model may be a supervised machine learning model, a semi-supervised machine learning model, an unsupervised machine learning model, or a reinforcement machine learning model. Examples of machine learning model algorithms include a Naïve Bayes classifier algorithm, K Means clustering algorithm, support vector machine algorithm, linear regression, logistic regression, artificial neural networks, decision trees, random forests, nearest neighbors, etc. The machine learning model may select the deduplication option based on previous deduplication option selections, historic deduplication ratios, backup time, etc.

At 706, a backup of the one or more objects is performed utilizing the corresponding determined deduplication option.

For an object associated with the first deduplication option, the storage system sends the data associated with the object to the storage system. The storage system ingests the data associated with the object and may perform in-line deduplication, post-processing deduplication, or a combination of partial in-line deduplication and partial post-processing deduplication on the data associated with the object.

For an object associated with the second deduplication option, the source system chunks the object data into variable-length data chunks, generates corresponding chunk identifiers for the variable-length data chunks, and sends the corresponding chunk identifiers to the storage system. In response, the storage system determines from the corresponding chunk identifiers which of the variable-length data chunks are not currently stored by the storage system and provides to the source system a list of one or more chunk identifiers corresponding to data chunks that are not currently stored by the storage system. The source system subsequently provides to the storage system the one or more data chunks corresponding to the one or more chunk identifiers included in the list.

For an object associated with the third deduplication option, the source system chunks the data associated with one or more determined missing ranges and/or one or more determined mismatched ranges into a plurality of variable-length data chunks, generates a plurality of corresponding data chunk identifiers, and provides the plurality of corresponding data chunk identifiers to the storage system. In some embodiments, the source system compares the plurality of generated data chunk identifiers to the one or more data chunk identifiers corresponding to the one or more data chunks associated with the one or more determined ranges included in the received range information and provides one or more corresponding data chunk identifiers not included in the received range information. In response, the storage system compares the received data chunk identifiers to data chunk identifiers included in the chunk metadata data structure to identify one or more of the plurality of variable-length data chunks that are not stored in a storage associated with the storage system. The storage system provides to the source system a response that identifies among the plurality of variable-length data chunks, one or more variable-length data chunks not already stored in the storage associated with the storage system. In some embodiments, the response identifies the one or more data chunk identifiers corresponding to variable-length data chunks not already stored in the storage associated with the storage system. In some embodiments, the response identifies the one or more data chunk identifiers corresponding to variable-length data chunks already stored in the storage associated with the storage system. In response, the source system may eliminate the one or more variable-length data chunks corresponding to the one or more identified data chunk identifiers. Subsequently, the source system provides content of the one or more variable-length data chunks not already stored in the storage associated with the storage system. The storage system receives and stores the content of the one or more variable-length data chunks not already stored in the storage associated with the storage system.

Figure 8:
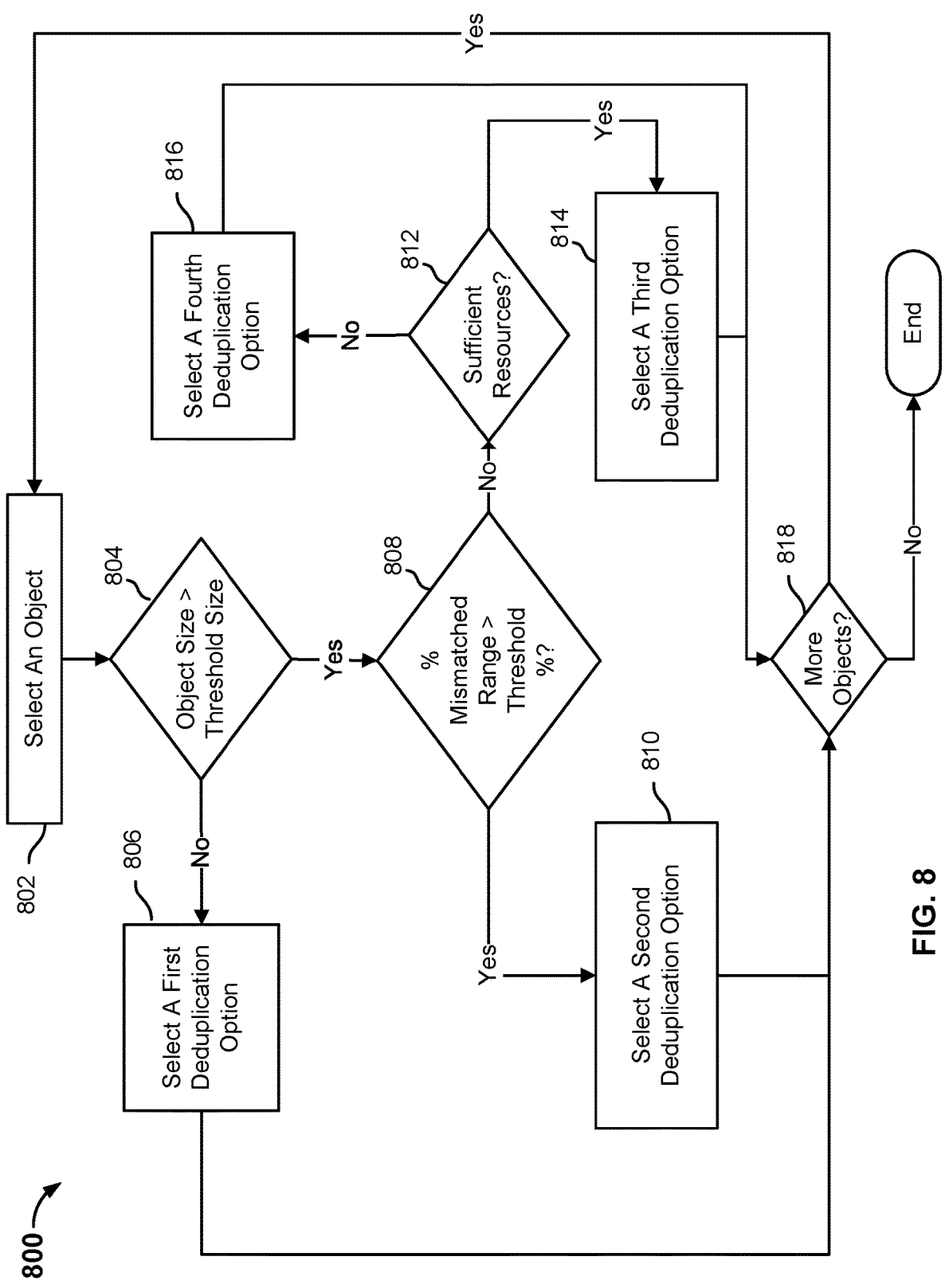
FIG. 8 is a flow diagram illustrating a process for selecting a deduplication option in accordance with some embodiments.

FIG. 8 is a flow diagram illustrating a process for selecting a deduplication option in accordance with some embodiments. In the example shown, process 800 is implemented by a backup agent, such as backup agent 104. In some embodiments, process 800 is implemented to perform some or all of step 704 of process 700.

At 802, an object is selected.

At 804, it is determined whether a size of the object is greater than a threshold size. In response to a determination that the object size is not greater than the threshold size, process 800 proceeds to 806. In response to a determination that the object size is greater than the threshold size, process 800 proceeds to 808.

At 806, a first deduplication option is selected. For an object associated with the first deduplication option, the storage system sends the data associated with the object to the storage system (i.e., no source side deduplication). In some embodiments, all of the data associated with the object is determined to be backed up when a full backup of the object is performed. In some embodiments, the data associated with the object that has changed since a previous backup is determined to be backed up when an incremental backup of the object is performed.

At 808, it is determined whether a percentage of mismatched ranges is greater than a threshold percentage. The data change pattern may be detected by using a rolling hash algorithm. In some embodiments, the detected data change pattern associated with the object includes one or more mismatched ranges (e.g., data overwrites and/or data insertions). In some embodiments, the detected data change pattern associated with the object includes one or more mismatched ranges and/or one or more missing ranges (e.g., data appends). In some embodiments, the detected data change pattern associated with the object includes one or more missing ranges.

In response to a determination that the percentage of mismatched ranges is greater than the threshold percentage, process 800 proceeds to 810. In response to a determination that the percentage of mismatched ranges is not greater than the threshold percentage, process 800 proceeds to 812.

At 810, a second deduplication option is selected. The second deduplication option includes performing source side deduplication for the object by chunking the data associated with the object into variable-length data chunks, generating corresponding chunk identifiers for the variable-length data chunks, and sending the corresponding chunk identifiers to the storage system. In response, the storage system may determine from the corresponding chunk identifiers which of the variable-length data chunks are not currently stored by the storage system and provide to the source system a list of one or more chunk identifiers corresponding to data chunks that are not currently stored by the storage system. The storage system may subsequently provide to the storage system the one or more data chunks corresponding to the one or more chunk identifiers included in the list.

At 812, it is determined whether the source system has sufficient resources to perform source-side deduplication. In response to a determination that the source system has sufficient resources to perform source-side deduplication, process 800 proceeds to 814. In response to a determination that the source system does not have sufficient resources to perform source-side deduplication, process 800 proceeds to 816.

At 814, a third deduplication option is selected. The third deduplication option includes performing source side deduplication for the one or more missing ranges and/or the one or more mismatched ranges associated with the object.

At 816, a fourth deduplication option is selected. The fourth deduplication option does not include performing source side deduplication for the one or more missing ranges and/or the one or more mismatched ranges. Instead, content associated with the one or more missing ranges and/or the one or more mismatched ranges is provided to the storage system.

At 818, it is determined whether there are one or more other objects. In response to a determination that there are one or more objects, process 800 returns to 802. In response to a determination that there are no more objects, process 800 ends.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:

determining a backup of one or more objects associated with a source system is to be performed;

based on one or more conditions for the one or more objects, selecting a corresponding deduplication option among a plurality of deduplication options to utilize when the backup of the one or more objects is performed, wherein the one or more conditions include a condition based on a data change pattern indicating at least one of one or more mismatch ranges for the one or more objects or one or more missing ranges for the one or more objects, and wherein the plurality of deduplication options include a deduplication option associated with utilizing a plurality of variable-length data chunks for one or more mismatched ranges and/or one or more missing ranges associated with the one or more objects;

providing to the source system a request to perform the backup of the one or more objects according to the corresponding selected deduplication option;

receiving, from the source system, backup data associated with the one or more objects, wherein the backup data comprises, according to the corresponding selected deduplication option, content data associated with the one or more objects or a plurality of data chunks associated with the one or more objects; and storing the backup data associated with the one or more objects.

2. The method of claim 1, wherein the one or more conditions for the one or more objects further include resource availability, data change rate, distribution of data change across objects, and/or object size.

3. The method of claim 1, wherein selecting the corresponding deduplication option includes determining a historical size for an object of the one or more objects and comparing the historical size for the object to a threshold size.

4. The method of claim 3, wherein selecting the corresponding deduplication option includes selecting a first deduplication option that does not include source side deduplication being performed for the object based on determining that the historical size for the object is not greater than the threshold size.

5. The method of claim 4, wherein based on a request to perform a backup of the object according to the first deduplication option, the source system determines a current size of the object.

6. The method of claim 5, wherein the source system provides, to a storage system, data associated with the object based on a determination that the current size of the object is not greater than the threshold size.

7. The method of claim 5, wherein the source system performs the source side deduplication for the object based on a determination that the current size of the object is greater than the threshold size.

8. The method of claim 3, wherein selecting the corresponding deduplication option includes determining an object identifier for an object of the one or more objects based on determining that the historical size for the object is greater than the threshold size.

9. The method of claim 8, wherein selecting the corresponding deduplication option comprises:

determining a percentage of historical mismatched ranges associated with different backed up versions of an object of the one or more objects; and comparing the percentage of historical mismatched ranges associated with the different backed up versions of the object to a threshold percentage.

10. The method of claim 9, wherein selecting the corresponding deduplication option includes selecting, for an object of the one or more objects, a second deduplication option based on determining that the percentage of historical mismatched ranges associated with different backed up versions of the object is greater than the threshold percentage.

11. The method of claim 10, wherein based on a request to perform a backup of the object according to the second deduplication option, the source system performs source side deduplication for the object utilizing variable-length data chunks.

12. The method of claim 9, wherein selecting the corresponding deduplication option includes:

selecting, for an object of the one or more objects, a third deduplication option that includes performing source side deduplication for one or more mismatched ranges and/or one or more missing ranges based on determining that the percentage of historical mismatched ranges associated with the different backed up versions of the object is not greater than the threshold percentage; and providing range information associated with the object in a request to perform a backup of the object according to the third deduplication option.

13. The method of claim 12, wherein based on the request to perform the backup of the object according to the third deduplication option, the source system determines one or more mismatched ranges and/or one or more missing ranges associated with the object.

14. The method of claim 13, wherein the source system determines whether there are sufficient CPU resources to perform source side deduplication for the one or more determined mismatched ranges and/or the one or more missing ranges associated with the object.

15. The method of claim 14, wherein the source system performs the source side deduplication for the one or more determined mismatched ranges and/or the one or more missing ranges associated with the object based on determining that the source system has sufficient CPU resources to perform source side deduplication for the object.

16. The method of claim 14, wherein the source system provides content data of the one or more determined mismatched ranges and/or the one or more missing ranges associated with the object based on determining that the source system does not have sufficient CPU resources to perform source side deduplication for the object.

17. The method of claim 12, wherein the range information associated with the object includes one or more range chunk identifiers, a corresponding offset for each of the one or more range chunk identifiers, and a corresponding length for one or more data chunks associated with a range chunk identifier for each of the one or more range chunk identifiers.

18. The method of claim 1, wherein storing the backup data associated with the one or more objects includes performing deduplication on the backup data associated with the one or more objects.

19. Non-transitory computer-readable media comprising computer instructions that, when executed by one or more processors, cause the one or more processors to:

determine a backup of one or more objects associated with a source system is to be performed;

based on one or more conditions for the one or more objects, select a corresponding deduplication option among a plurality of deduplication options to utilize when the backup of the one or more objects is performed, wherein the one or more conditions include a condition based on a data change pattern indicating at least one of one or more mismatch ranges or one or more missing ranges for the one or more objects, and wherein the plurality of deduplication options include a deduplication option associated with utilizing a plurality of variable-length data chunks for one or more mismatched ranges and/or one or more missing ranges associated with the one or more objects associated with the source system;

provide to the source system a request to perform the backup of the one or more objects according to the corresponding selected deduplication option;

receive, from the source system, backup data associated with the one or more objects, wherein the backup data comprises, according to the corresponding selected deduplication option, content data associated with the one or more objects or a plurality of data chunks associated with the one or more objects; and store the backup data associated with the one or more objects.

20. A system, comprising:

memory storing instructions;

a processor configured to execute the instructions to:

determine a backup of one or more objects associated with a source system is to be performed;

based on one or more conditions for the one or more objects, select a corresponding deduplication option among a plurality of deduplication options to utilize when the backup of the one or more objects is performed, wherein the one or more conditions include a condition based on a data change pattern indicating at least one of one or more mismatch ranges or one or more missing ranges for the one or more objects, and wherein the plurality of deduplication options include a deduplication option associated with utilizing a plurality of variable-length data chunks for one or more mismatched ranges and/or one or more missing ranges associated with the one or more objects;

provide to the source system a request to perform the backup of the one or more objects according to the corresponding selected deduplication option;

receive, from the source system, backup data associated with the one or more objects, wherein the backup data comprises, according to the corresponding selected deduplication option, content data associated with the one or more objects or a plurality of data chunks associated with the one or more objects; and store the backup data associated with the one or more objects.

* * * * *